United States Patent
Kang et al.

(10) Patent No.: US 12,257,813 B2
(45) Date of Patent: Mar. 25, 2025

(54) WINDOW AND MANUFACTURING METHOD THEREOF

(71) Applicant: Samsung Display Co., Ltd., Yongin-Si (KR)

(72) Inventors: Byunghoon Kang, Hwaseong-si (KR); Seung Kim, Seongnam-si (KR); Seungho Kim, Asan-si (KR); Gyuin Shim, Yongin-si (KR); Seongjin Hwang, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 15 days.

(21) Appl. No.: 17/357,072

(22) Filed: Jun. 24, 2021

(65) Prior Publication Data
US 2022/0118734 A1    Apr. 21, 2022

(30) Foreign Application Priority Data

Oct. 16, 2020    (KR) .................. 10-2020-0134649

(51) Int. Cl.
*B32B 3/28*    (2006.01)
*B32B 7/12*    (2006.01)
(Continued)

(52) U.S. Cl.
CPC .................. *B32B 3/28* (2013.01); *B32B 7/12* (2013.01); *B32B 17/06* (2013.01); *B32B 37/12* (2013.01);
(Continued)

(58) Field of Classification Search
CPC .. B32B 3/28; B32B 7/12; B32B 17/06; B32B 2250/02; B32B 2255/00; B32B 2307/41;
(Continued)

(56) References Cited

U.S. PATENT DOCUMENTS 5,340,654 A    8/1994 Ueda et al.
9,395,759 B2    7/2016 Lee
(Continued)

FOREIGN PATENT DOCUMENTS

KR    100192528 B1    6/1999
KR    101146602 B1    5/2012
(Continued)

OTHER PUBLICATIONS

[NPL-1] Kim et al. (KR 10-2016-0124449 A); Oct. 28, 2016, (EPO—machine translation to English). (Year: 2016).*

*Primary Examiner* — Maria V Ewald
*Assistant Examiner* — Donald M Flores, Jr.
(74) *Attorney, Agent, or Firm* — CANTOR COLBURN LLP

(57) ABSTRACT

A window includes a first glass substrate having a first thickness and including a first flat part and a second flat part, which face each other, with a first curved part disposed therebetween; a second glass substrate having a second thickness, disposed at an inner side of the first glass substrate, and including a third flat part and a fourth flat part, which face each other, with a second curved part disposed therebetween; and a light shielding layer disposed between the first glass substrate and the second glass substrate or disposed at an inner side of the second glass substrate.

9 Claims, 22 Drawing Sheets

(51) Int. Cl.
*B32B 17/06* (2006.01)
*B32B 37/12* (2006.01)
*B32B 37/18* (2006.01)
*B32B 38/00* (2006.01)
*C03C 17/00* (2006.01)
*C03C 27/10* (2006.01)

(52) U.S. Cl.
CPC ............ *B32B 37/18* (2013.01); *B32B 38/145* (2013.01); *C03C 17/001* (2013.01); *C03C 27/10* (2013.01); *B32B 2250/02* (2013.01); *B32B 2255/00* (2013.01); *B32B 2307/4023* (2013.01); *B32B 2307/41* (2013.01); *B32B 2309/02* (2013.01); *B32B 2315/08* (2013.01); *B32B 2457/20* (2013.01)

(58) Field of Classification Search
CPC .. B32B 2315/08; B32B 2457/20; C03C 27/10
See application file for complete search history.

(56) References Cited

U.S. PATENT DOCUMENTS

| | | | |
|---|---|---|---|
| 10,261,546 B2 | 4/2019 | Park et al. | |
| 10,586,944 B2 | 3/2020 | Ahn et al. | |
| 10,791,206 B2 * | 9/2020 | Lee | H04M 1/0269 |
| 2015/0314571 A1 * | 11/2015 | Cites | C03C 3/097 501/63 |
| 2016/0221293 A1 * | 8/2016 | Park | B32B 37/14 |
| 2018/0132371 A1 * | 5/2018 | Yeum | B32B 17/00 |

FOREIGN PATENT DOCUMENTS

| | | | | |
|---|---|---|---|---|
| KR | 1020130007786 A | | 1/2013 | |
| KR | 101252157 B1 | | 4/2013 | |
| KR | 1020160008722 A | | 1/2016 | |
| KR | 2016124449 A | * | 10/2016 | ............ B41M 1/34 |
| KR | 1020160124449 A | | 10/2016 | |
| KR | 1020170024230 A | | 3/2017 | |
| KR | 1020170034579 A | | 3/2017 | |
| KR | 1020180073236 A | | 7/2018 | |
| KR | 1020180075779 A | | 7/2018 | |
| KR | 1020180084013 A | | 7/2018 | |
| KR | 101927801 B1 | | 2/2019 | |
| KR | 102034930 B1 | | 10/2019 | |
| KR | 102081828 B1 | | 2/2020 | |
| WO | 2013009021 A2 | | 1/2013 | |

* cited by examiner

WINDOW AND MANUFACTURING METHOD THEREOF

This application claims priority to Korean Patent Application No. 10-2020-0134649, filed on Oct. 16, 2020, and all the benefits accruing therefrom under 35 U.S.C. § 119, the content of which in its entirety is herein incorporated by reference.

BACKGROUND

The present disclosure herein relates to a window and a manufacturing method thereof, and more particularly, to a bonding window having a curved part bent with a large bending angle and a manufacturing method thereof.

An electronic device includes a window, a housing, and an electronic element. The electronic element may include various elements such as a display element, a touch element, or a detection element, which are activated by an electronic signal. The window protects the electronic element and provides an activation area to a user. Thus, the user provides an input to the electronic element or receives information generated from the electronic element through the window. Also, the electronic element may be stably protected from an external impact by the window.

In recent years, a curved display device or a bending display device that displays an image through a front surface, a rear surface, and a side surface thereof has been developed. Thus, a window processing technology capable of being used in various types of display devices is required to be developed.

SUMMARY

The present disclosure provides a bonding window having a curved part bent to have a large bending angle.

The present disclosure also provides a method for manufacturing a window, which is capable of easily forming a light shielding layer at an inner side of a glass substrate having a curved part bent to have a large bending angle.

An embodiment of the inventive concept provides a window including: a first glass substrate having a first thickness and including a first flat part and a second flat part, which face each other, with a first curved part disposed therebetween; a second glass substrate having a second thickness, disposed at an inner side of the first glass substrate, and including a third flat part and a fourth flat part, which face each other, with a second curved part disposed therebetween; and a light shielding layer disposed between the first glass substrate and the second glass substrate or disposed at an inner side of the second glass substrate.

In an embodiment, each of the first glass substrate and the second glass substrate may include: a first area which overlaps the light shielding layer in a plan view at an; and a second area which does not overlap with the light shielding layer, and the first area may surround the second area.

In an embodiment, the light shielding layer may be disposed at the inner side of the second glass substrate, and the first glass substrate may have a thickness greater than a thickness of the second glass substrate.

In an embodiment, the first glass substrate may have the thickness in a range from about 100 micrometers ($\mu$m) to about 1000 $\mu$m, and the second glass substrate may have the thickness in a range from about 20 $\mu$m to about 100 $\mu$m.

In an embodiment, the window may further include an adhesive layer disposed between the first glass substrate and the second glass substrate.

In an embodiment, the light shielding layer may be disposed between the first glass substrate and the second glass substrate, and the first glass substrate may have a thickness less than a thickness of the second glass substrate.

In an embodiment, the first glass substrate may have the thickness in a range from about 20 $\mu$m to about 100 $\mu$m, and the second glass substrate may have the thickness in a range from about 100 $\mu$m to about 1000 $\mu$m.

In an embodiment, the light shielding layer may have a thickness in a range from about 5 $\mu$m to about 10 $\mu$m.

In an embodiment, the second curved part may have an inner radius of curvature in a range from about 3 millimeters (mm) to about 4 mm.

In an embodiment, an average distance between the third flat part and the fourth flat part may be in a range from about 6 mm to about 8 mm.

In an embodiment of the inventive concept, a method for manufacturing a window using a window processing apparatus including a processing jig including a support surface, a groove recessed from the support surface, and a heating part disposed in the groove and a pressing part disposed on the processing jig and controlled to operation in a vertical direction includes: arranging a first glass substrate in the groove, where the first glass substrate includes a first flat part, a second flat part, and a first curved part disposed between the first flat part and the second flat part; providing a heat transfer film on the support surface, where the heat transfer film includes a base film and an ink layer disposed on the base film; pressing the heat transfer film to the first glass substrate by moving the pressing part in a downward direction from above the heat transfer film to the groove; transferring the ink layer to the glass substrate by heating the heating part; removing the pressing part from the groove; and removing the base film from the groove, wherein the removed base film corresponds to the heat transfer film after the ink layer is removed from the heat transfer film.

In an embodiment, the pressing part may include a support and a head protruding to one side from the support, and the pressing of the heat transfer film to the first glass substrate may include: inserting the head to the groove by moving the pressing part downward and arranging the support on the support surface; and expanding the head.

In an embodiment, the expanding of the head may include providing air inside the head.

In an embodiment, the transferring of the ink layer to the first glass substrate may include heating the heating part in a range from about 100 degrees in Celsius (° C.) to about 200° C.

In an embodiment, the method may further include: after the removing of the base film, removing the first glass substrate, to which the ink layer is transferred, from the groove; providing a second glass substrate to be bonded, where the second glass substrate includes a third flat part and a fourth flat part, which face each other, with a second curved part disposed therebetween; and arranging the first glass substrate to an inner side or an outer side of the second glass substrate to be bonded. Here, the arranging of the first glass substrate to the inner side or the outer side of the second glass substrate to be bonded may arrange the first glass substrate and the second glass substrate such that the first flat part overlaps the third flat part, the second flat part overlaps the fourth flat part, and the first curved part overlaps the second curved part.

In an embodiment, the arranging of the first glass substrate to the outer side of the second glass substrate to be bonded may include arranging an adhesive layer between an inner side of the first glass substrate and the outer side of the second glass substrate to be bonded.

In an embodiment, the arranging of the first glass substrate to the inner side of the second glass substrate to be bonded may include arranging an adhesive layer between an outer side of the first glass substrate and the inner side of the second glass substrate to be bonded.

In an embodiment, the base film may have a thickness in a range from about 25 µm to about 50 µm, and the ink layer may have a thickness in a range from about 5 µm to about 10 µm.

In an embodiment of the inventive concept, a window includes: a first glass substrate including a first flat part and a second flat part, which face each other, with a first curved part disposed therebetween; and a light shielding layer disposed at an inner side of the first glass substrate. Here, the first glass substrate includes: a first area which overlaps the light shielding layer in a plan view; and a second area which does not overlap with the light shielding layer, and the first area surrounds the second area.

In an embodiment, the window may further include a second glass substrate, which is disposed at an inner side or an outer side of the first glass substrate and includes a third flat part and a fourth flat part, which face each other, with a second curved part disposed therebetween.

In an embodiment, the second glass substrate may be disposed at the inner side of the first glass substrate, and the first curved part may have an inner radius of curvature greater than an outer radius of curvature of the second curved part.

In an embodiment, the second glass substrate may be disposed at the outer side of the first glass substrate, and the first curved part may have an outer radius of curvature equal to or less than an inner radius of curvature of the second curved part.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1A:
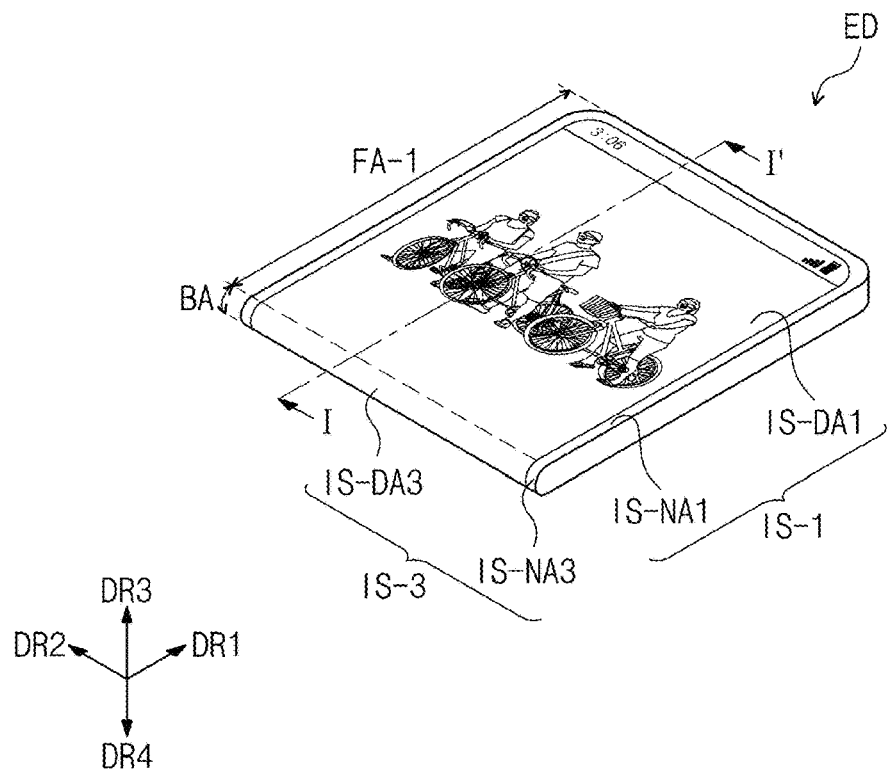
FIG. 1A is a perspective view illustrating an electronic device according to an embodiment.

Since the present disclosure may have diverse modified embodiments, preferred embodiments are illustrated in the drawings and are described in the detailed description of the invention. However, this does not limit the present disclosure within specific embodiments and it should be understood that the present disclosure covers all the modifications, equivalents, and replacements within the idea and technical scope of the inventive concept.

In this specification, it will also be understood that when one component (or region, layer, portion) is referred to as being 'on', 'connected to', or 'coupled to' another component, it can be directly disposed/connected/coupled on/to the another component, or an intervening third component may also be present.

In this application, it will be understood that when a layer, a film, a region, or a plate is "directly contact" another layer, film, region, or plate, further another layer, film, region, or plate can not be present therebetween. For example, a feature of being "directly disposed" may represent that two layers or two members are disposed without using an additional member such as an adhesive member.

Like reference numerals refer to like elements throughout. Also, in the figures, the thickness, ratio, and dimensions of components are exaggerated for clarity of illustration.

The term "and/or" includes any and all combinations of one or more of the associated listed items. "About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

It will be understood that although the terms such as 'first' and 'second' are used herein to describe various elements, these elements should not be limited by these terms. The terms are only used to distinguish one component from other components. For example, a first element referred to as a first element in one embodiment can be referred to as a second element in another embodiment without departing from the scope of the appended claims. The terms of a singular form may include plural forms unless referred to the contrary.

Also, ""under", "below", "above', "upper", and the like are used for explaining relation association of components illustrated in the drawings. The terms may be a relative concept and described based on directions expressed in the drawings. In the specification, it will be understood that when one member is referred to as being 'on' the other member, it can be disposed on an upper portion of the other member or disposed on a lower portion of the other member.

Unless otherwise defined, all terms (including technical and scientific terms) used herein have the same meaning as generally understood by those skilled in the art. Terms as defined in a commonly used dictionary should be construed as having the same meaning as in an associated technical context, and unless defined apparently in the description, the terms are not ideally or excessively construed as having formal meaning.

The meaning of 'include' or 'comprise' specifies a property, a fixed number, a step, an operation, an element, a component or a combination thereof, but does not exclude other properties, fixed numbers, steps, operations, elements, components or combinations thereof.

Hereinafter, a window and a manufacturing method thereof according to an embodiment of the inventive concept will be described with reference to the accompanying drawings.

Figure 1B:
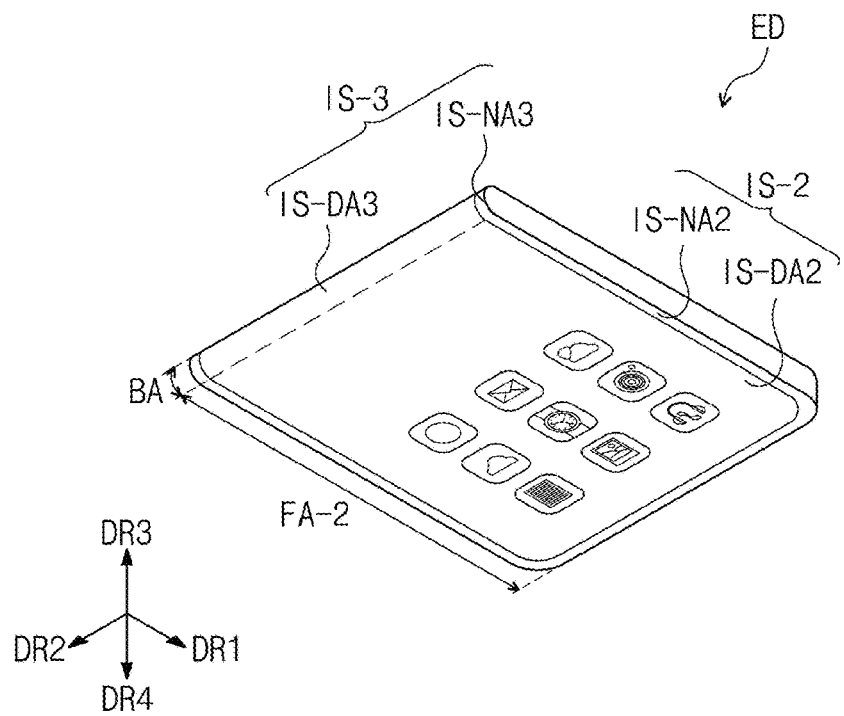
FIG. 1B is another perspective view illustrating the electronic device according to an embodiment.

FIGS. 1A and 1B are perspective views illustrating an electronic device according to an embodiment of the inventive concept. An electronic device ED according to an embodiment may include a plurality of display surfaces IS-1, IS-2, and IS-3. An electronic device ED according to an embodiment may include a plurality of display surfaces IS-1, IS-2, and IS-3.

FIGS. 1A and 1B are perspective views on the same electronic device ED according to viewing directions. FIG. 1A is a front perspective view of the electronic device ED when viewed in a direction of a third directional axis DR3, and FIG. 1B is a rear perspective view of the electronic device ED when viewed in a direction of a fourth directional axis DR4.

Although the first directional axis DR1 to the fourth directional axis DR4 are illustrated in FIGS. 1A and 1B and drawings below, directions indicated by the first to fourth directional axes DR1, DR2, DR3, and DR4 as relative concepts, may be converted with respect to each other.

In this specification, the first directional axis DR1 and the second directional axis DR2 are perpendicular to each other, and each of the third directional axis DR3 and the fourth directional axis DR4 is a normal direction with respect to a plane defined by the first and second directional axes DR1 and DR2. The third directional axis DR3 and the fourth directional axis DR4 may extend in opposite directions.

The electronic device ED according to an embodiment may be activated by an electrical signal. The electronic device ED may include various embodiments. For example, the electronic device ED may include various embodiments. For example, the electronic device ED may include tablets, notebook computers, personal computers, and smart televisions. In this embodiment, the electronic device ED is exemplarily illustrated as a smartphone.

The electronic device ED may include a first flat area FA-1 including a first display surface IS-1, a second flat area FA-2 including a second display surface IS-2, and a bending area BA including a third display surface IS-3. The bending area BA may be disposed between the first display surface IS-1 and the second display surface IS-2 and have a staple shape (a "⊏"-shape). The first flat area FA-1 and the second flat area FA-2 may be spaced apart from each other to face each other in the direction of the third directional axis DR3.

The first display surface IS-1 may include a first display area IS-DA1 and a first peripheral area IS-NA1 adjacent to the first display area IS-DA1. The second display surface IS-2 may include a second display area IS-DA2 and a second peripheral area IS-NA2 adjacent to the second display area IS-DA2, and the third display surface IS-3 may include a third display area IS-DA3 and a third peripheral area IS-NA3 adjacent to the third display area IS-DA3. In this specification, the display areas IS-DA1, IS-DA2, and IS-DA3 are defined as areas on which an image is substantially displayed. The peripheral areas IS-NA1, IS-NA2, and IS-NA3 are defined as a non-display area on which an image is not displayed. Each of the peripheral areas IS-NA1, IS-NA2, and IS-NA3 may have various colors through a printed layer. However, the embodiment of the inventive concept is not limited thereto. In another embodiment, for example, at least a portion of the peripheral areas IS-NA1, IS-NA2, and IS-NA3 may be omitted.

The first display surface IS-1 may be parallel to a plane defined by the first directional axis DR1 and the second directional axis DR2. The first display surface IS-1 may be a flat surface when viewed on a plane. In this specification, an expression "when viewed on a plane" or "on a plane" (i.e., in a plan view) may represent a case when viewed in the direction of the third directional axis DR3 or the direction of the fourth directional axis DR4. Hereinafter, a front surface (or top surface) and a rear surface (or bottom surface) of each of layers or units are distinguished by the third directional axis DR3. The first display area IS-DA1 of the first display surface IS-1 may provide an image in the direction of the third directional axis DR3.

Also, in the electronic device ED according to an embodiment, the second display surface IS-2 may be parallel to the plane defined by the first directional axis DR1 and the second directional axis DR2. The second display surface IS-2 may be a flat surface when viewed on the plane. The second display surface IS-2 may be parallel to the first display surface IS-1. The second display area IS-DA2 of the second display surface IS-2 may provide an image in the direction of the fourth directional axis DR4.

The third display surface IS-3 may be disposed between the first display surface IS-1 and the second display surface IS-2, and an angle between the first display surface IS-1 and the second display surface IS-2 may be about 180 degrees (°) with respect to the third display surface IS-3. The third display area IS-DA3 of the third display surface IS-3 may provide an image in a direction of the first directional axis DR1. The first display surface IS-1 and the second display surface IS-2 may be spaced apart from each other with the third display area IS-DA3 therebetween in the direction of the third directional axis DR3 or the fourth directional axis DR4. The third display surface IS-3 may have a curved shape that is convex to the outside. However, the embodiment of the inventive concept is not limited thereto. In another embodiment, for example, the third display surface IS-3 may be a flat surface or have a curved surface shape having a semi-elliptical shape on a cross-section parallel to a surface defined by the first directional axis DR1 and the third directional axis DR3. Alternatively, the third display surface IS-3 may include all of the curved surface and the flat surface. Also, the third display surface IS-3 may provide an image in a different direction from an image providing direction of each of the first display surface IS-1 and the second display surface IS-2 and have various shapes including a curved part between the first display surface IS-1 and the second display surface IS-2.

The first to third display areas IS-DA1, IS-DA2, and IS-DA3 may display different images from each other. The images displayed on the first to third display areas IS-DA1, IS-DA2, and IS-DA3 may be the same image or different images. Alternatively, images displayed on each of the first to third display areas IS-DA1, IS-DA2, and IS-DA3 may be connected to display one image. Each of the first to third display areas IS-DA1, IS-DA2, and IS-DA3 may be independently controlled.

Figure 1C:
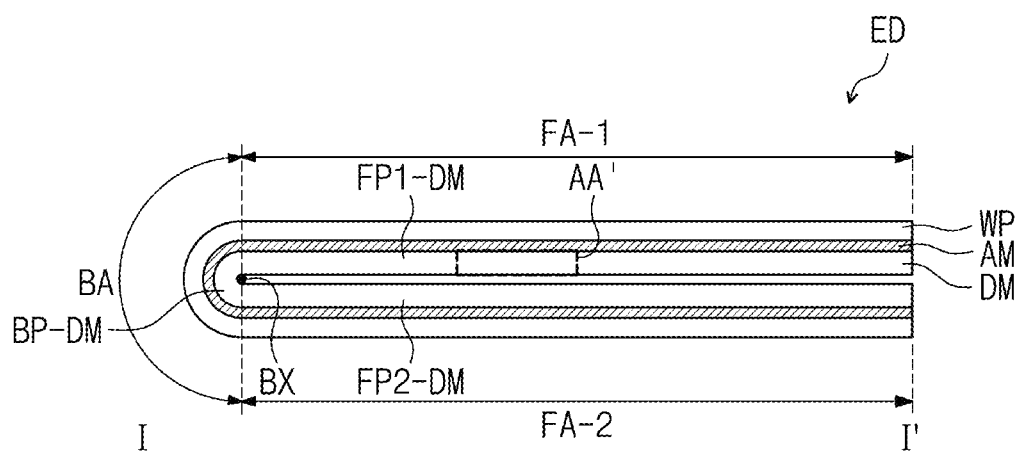
FIG. 1C is a cross-sectional view illustrating the electronic device according to an embodiment.
Figure 1C:
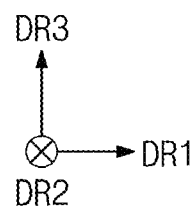
Figure 1D:
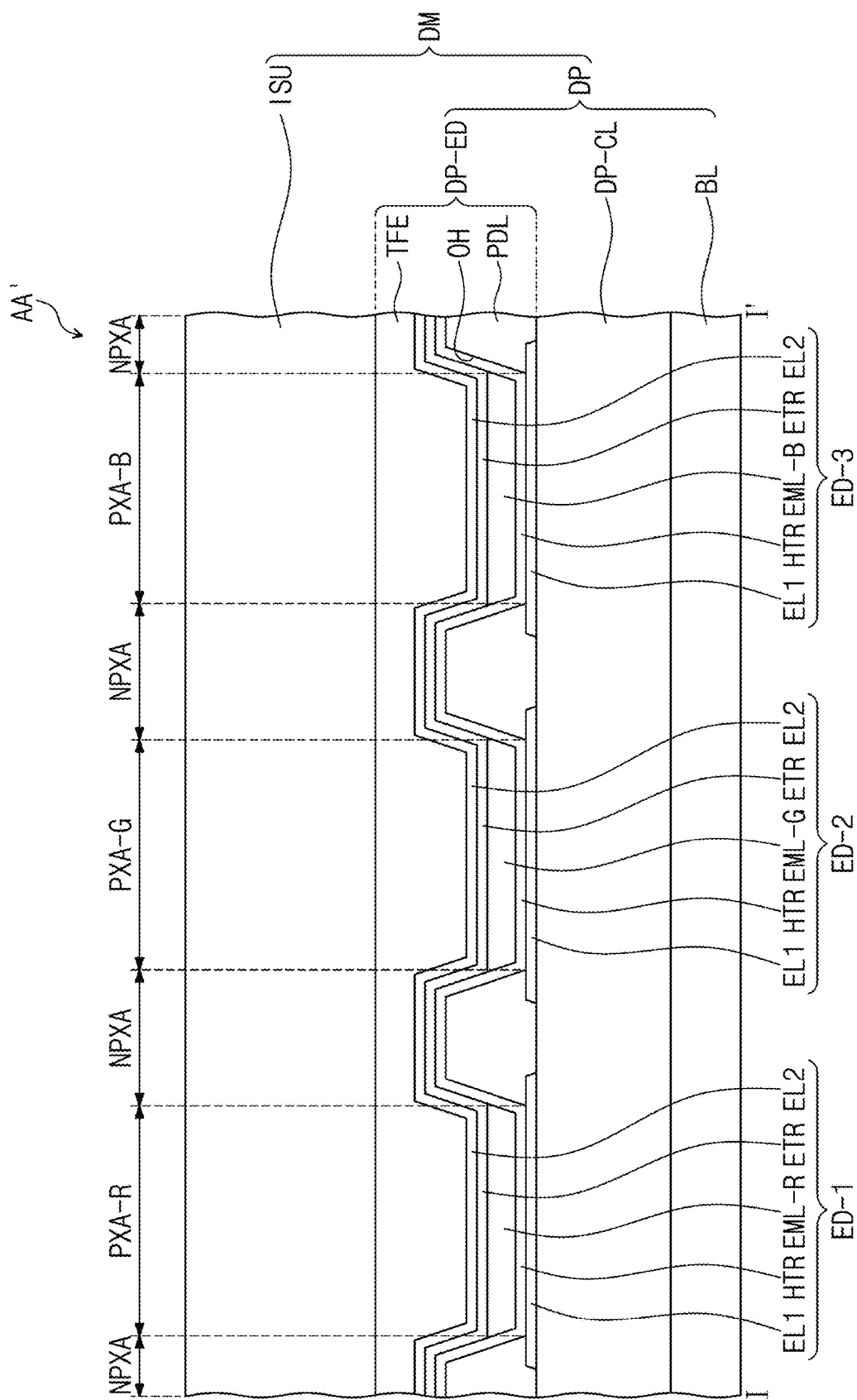
FIG. 1D is a cross-sectional view illustrating a portion corresponding to area AA' in FIG. 1C.

FIG. 1C is a cross-sectional view illustrating the electronic device according to an embodiment. FIG. 1D is a cross-sectional view illustrating a portion corresponding to area AA' in FIG. 1C.

Referring to FIG. 1C, the electronic device ED according to an embodiment may include a display module DM and a window WP disposed on the display module DM. In an embodiment, the window WP may be disposed outside the display module DM. The window WP may cover an entire outer side of the display module DM. The window WP may have a shape corresponding to that of the display module DM. The display module DM may include flat parts FP1-DM and FP2-DM and a bending part BP-DM. The bending part BP-DM may be bent with respect to a virtual bending axis BX extending in one direction parallel to the second directional axis DR2.

In an embodiment, an adhesive layer AM may be disposed between the display module DM and the window WP. The adhesive layer AM may be optically clear adhesive.

Referring to FIG. 1D, the display module DM according to an embodiment may include a display panel DP outputting an image in the electronic device ED. The display panel DP according to an embodiment may include a light emitting element layer DP-ED containing an organic light emitting element, a quantum dot light emitting element, a micro-LED light emitting element, or a nano-LED light emitting element. The light emitting element layer DP-ED may be a component that substantially generates an image. Hereinafter, although the display panel DP is described as an organic light emitting display panel, the embodiment of the inventive concept is not limited thereto.

The display panel DP according to an embodiment may have a bent shape as illustrated in FIG. 1C. However, the embodiment of the inventive concept is not limited thereto. For example, the display panel DP may have a bent shape that is different from the bent shape illustrated in FIG. 1C or may be a flexible display panel that is bent or unbent. For example, the flexible display panel DP may be bent to be inserted into the window WP bent to have a large bending angle.

The display panel DP includes a base layer BL, a circuit element layer DP-CL disposed on the base layer BL, a light emitting element layer DP-ED, and an upper insulation layer TFE. The base layer BL may include a plastic substrate, a glass substrate, a metal substrate, or an organic/inorganic composite substrate. For example, the base layer BL may include at least one polyimide layer.

The circuit element layer DP-CL includes at least one insulation layer, semiconductor patterns, and conductive patterns. The insulation layer includes at least one inorganic layer and at least one organic layer. The semiconductor patterns and the conductive patterns may constitute signal lines, a pixel driving circuit, and a scan driving circuit. For example, the circuit element layer DP-CL may include a switching transistor and a driving transistor for driving light emitting elements ED-1, ED-2 and ED-3 of the light emitting element layer DP-ED.

The light emitting element layer DP-ED includes a display element, e.g., the light emitting elements ED-1, ED-2 and ED-3. The light emitting element layer DP-ED may further include an organic layer such as a pixel defining layer PDL. The display module DM may include a non-light emitting area NPXA and light emitting areas PXA-R, PXA-G, and PXA-B. Each of the light emitting areas PXA-R, PXA-G, and PXA-B may emit light generated from each of the light emitting elements ED-1, ED-2 and ED-3.

Each of the light emitting elements ED-1, ED-2 and ED-3 may include a first electrode EL1, a hole transport region HTR, a light emitting layer EML-R, EML-G, and EML-B, an electron transport region ETR, and a second electrode EL2.

FIG. 1D illustrates an embodiment in which the light emitting layer EML-R, EML-G, and EML-B of each of the light emitting elements ED-1, ED-2 and ED-3 are disposed in an opening OH defined in the pixel defining layer PDL, and the hole transport region HTR, the electron transport region ETR, and the second electrode EL2 are provided as a common layer over all of the light emitting elements ED-1, ED-2 and ED-3. However, the embodiment of the inventive concept is not limited thereto. For example, unlike as illustrated in FIG. 1D, the hole transport region HTR and the electron transport region ETR may be patterned in the opening OH defined in the pixel defining layer PDL. For example, in an embodiment, the hole transport region HTR, the light emitting layer EML-R, EML-G, and EML-B, and the electron transport region ETR of the light emitting elements ED-1, ED-2 and ED-3 may be patterned by an inkjet printing method.

In the display panel DP according to an embodiment, a plurality of light emitting elements ED-1, ED-2 and ED-3 may emit light in wavelength regions different from each other. For example, in an embodiment, the display panel DP may include a first light emitting element ED-1 emitting red light, a second light emitting element ED-2 emitting green light, and a third light emitting element ED-1 emitting blue light. That is, the red light emitting area PXA-R, the green light emitting area PXA-G, and the blue light emitting area PXA-B of the display module may correspond to the first light emitting element ED-1, the second light emitting element ED-2, and the third light emitting element ED-3, respectively.

However, the embodiment of the inventive concept is not limited thereto. For example, the first to third light emitting elements ED-1, ED-2, and ED-3 may emit light in the same wavelength region or at least one light in a different wavelength region. For example, all of the first to third light emitting elements ED-1, ED-2, and ED-3 may emit blue light.

The upper insulation layer TFE may include a plurality of thin-films. A portion of the thin-films is disposed to enhance an optical efficiency, and another portion of the thin-films is disposed to protect the light emitting elements. The upper insulation layer TFE may include a thin-film encapsulation layer having a laminated structure of an inorganic layer/an organic layer/an inorganic layer.

Also, the display module DM may further include a sensor layer ISU. The sensor layer ISU may be disposed on the display layer DP. The sensor layer ISU may sense an external input applied from the outside. The external input may be an input of a user. For example, the input of the user may include various types of external inputs such as a portion of a user's body, light, heat, a pen or pressure.

The sensor layer ISU may be provided on the upper insulation layer TFE through a continuous process. This case may represent that the sensor layer ISU is directly disposed on the upper insulation layer TFE. The feature of being directly disposed may represent that a third component is not present between the sensor layer ISU and the upper insulation layer TFE. That is, a separate adhesive member may not be disposed between the sensor layer ISU and the upper insulation layer TFE. However, the embodiment of the inventive concept is not limited thereto. For example, an adhesive member (not shown) may be further disposed between the sensor layer ISU and the upper insulation layer TFE. In an embodiment, the sensor layer ISU may include sensing electrodes for sensing an external input, and the sensing electrodes may include a transparent metal oxide.

Figure 2A:
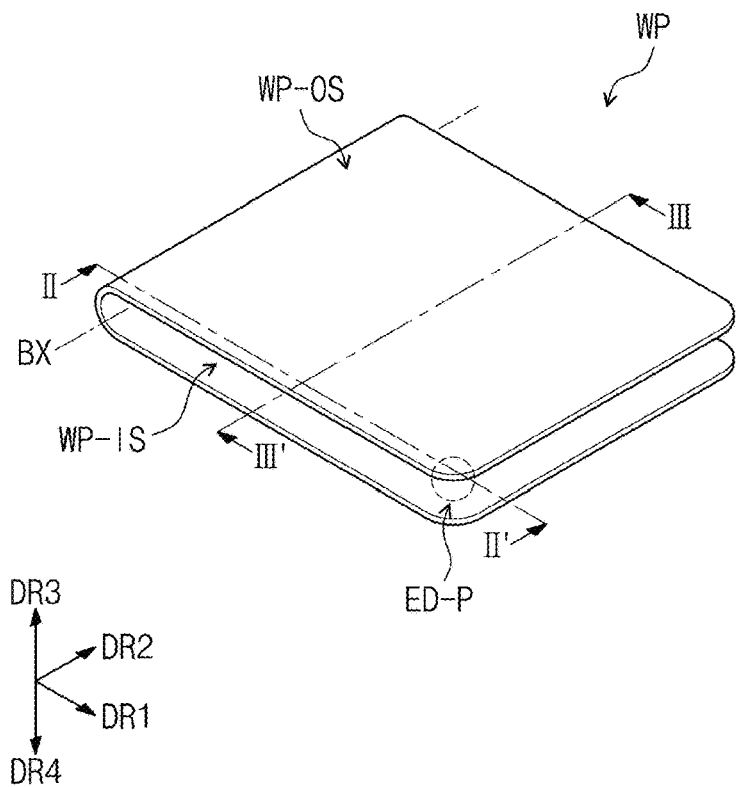
FIG. 2A is a perspective view illustrating a window according to an embodiment.
Figure 2B:
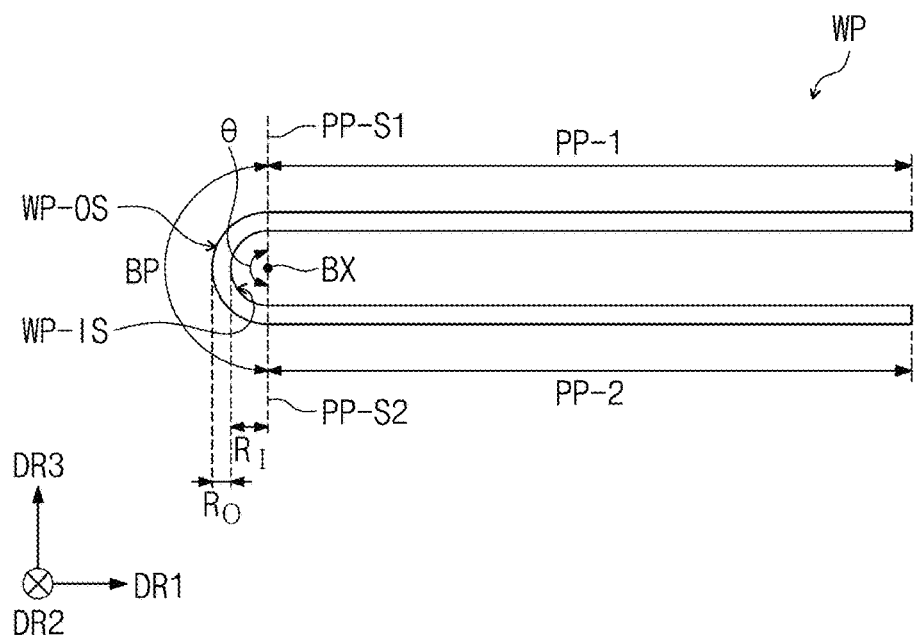
FIG. 2B is a side view illustrating the window according to an embodiment.

FIG. 2A is a perspective view illustrating the window WP according to an embodiment, and FIG. 2B is a side view illustrating the window according to an embodiment.

The window WP according to an embodiment in FIGS. 2A and 2B may be contained in the electronic device ED (refer to FIG. 1A) according to an embodiment in FIGS. 1A to 1C. The window WP may correspond to an uppermost layer of the electronic device ED. The window WP may be a tempered glass substrate. The display module DM (refer to FIG. 1C) may be attached to an inner side WP-IS of the window WP, and an outer side WP-OS may be the display surface IS-1, IS-2, and IS-3 (refer to FIGS. 1A and 1B). The window WP may stably protect the display module DM (refer to FIG. 1C) from an external impact by including a strengthening-treated surface.

The window WP according to an embodiment may include a first portion, a second portion, and a third portion disposed between the first portion and the second portion. The third portion may be disposed between the first portion and the second portion and include a curved portion. The third portion may be a portion including a curved surface or a flat surface.

Hereinafter, in this specification, the third portion BP is referred to as a bending part BP, and the first part PP-1 and the second part PP-2 are referred to as a first non-bending portion PP-1 and a second non-bending portion PP-2, respectively. The window WP according to an embodiment may include the bending part BP and the first and second non-bending parts PP-1 and PP-2 that are disposed at opposite sides of the bending part BP, respectively. The bending part BP may be bent with respect to the bending axis BX extending in one direction parallel to the second directional axis DR2. In the window WP according to an embodiment, the first non-bending part PP-1 and the second non-bending part PP-2, which are disposed with the bending part BP therebetween, may be parallel to each other. However, the embodiment of the inventive concept is not limited thereto. In another embodiment, an extension surface of the first non-bending part PP-1 and an extension surface of the second non-bending part PP-2 may not be parallel to each other. For example, a spaced distance between the extension surface of the first non-bending part PP-1 and the extension surface of the second non-bending part PP-2 may gradually decrease in the direction of the first directional axis DR1 or gradually increase in the direction of the first directional axis DR1.

The window WP according to an embodiment may be rigid. In the window WP according to an embodiment, the first non-bending part PP-1 and the second non-bending part PP-2 may be fixed in a state in which the first non-bending part PP-1 and the second non-bending part PP-2 are spaced apart from each other to face each other with the bending part BP therebetween in a folded state.

Although the first non-bending part PP-1 and the second non-bending part PP-2, which face each other, have the same area in FIGS. 2A and 2B, the embodiment of the inventive concept is not limited thereto. Alternatively, the first non-bending part PP-1 and the second non-bending part PP-2, which are disposed with the bending part BP therebetween, may have different areas from each other. Also, although the first non-bending part PP-1 and the second non-bending part PP-2, which face each other, have symmetrical shapes with respect to the bending part BP in FIGS. 2A and 2B, the embodiment of the inventive concept is not limited thereto. In another embodiment, for example, the first non-bending part PP-1 and the second non-bending part PP-2 may have different shapes from each other.

In the window WP according to an embodiment, the bending part BP may be defined as a portion between a point PP-S1 at which the first non-bending part PP-1 is initiated and a point PP-S2 at which the second non-bending part PP-2 is initiated. That is, the point PP-S1 is a border between the first non-bending part PP-1 and the bending part BP, and the point PP-S2 is a border between the second non-bending part PP-2 and the bending part BP. In an embodiment, the bending part BP may be a portion of a circle having a predetermined radius of curvature on a cross-section or a portion of an oval on a cross-section. Also, the bending part BP may include all of a curved surface and a flat surface.

In this specification, a bending angle θ of the bending part BP may be defined as an angle between the point PP-S1 at which the first non-bending part PP-1 is initiated and the point PP-S2 at which the second non-bending part PP-2 is initiated. The bending angle θ in the window WP according to an embodiment in FIGS. 2A and 2B may be about 180° in a fully folded state.

The window WP according to an embodiment, which is manufactured as an embodiment of a window processing apparatus according to an embodiment of the inventive concept may have the bending angle θ greater than about 120°. That is, the window WP according to an embodiment may be bent by a large bending angle greater than about 120°. Also, the window WP according to an embodiment may have the bending angle θ greater than about 180° when fully bent with assumption that only the bending part BP exists. For example, the bending angle θ may be equal to or greater than about 180° within a range in which the non-bending portions PP-1 and PP-2 do not meet each other. Although four corner edges ED-P of the window WP according to an embodiment are curved surfaces in FIG. 2A, the embodiment of the inventive concept is not limited thereto. On a plane defined by the first directional axis DR1 and the second directional axis DR2, at least one of the corner edges ED-P of the window may have a right-angled shape. For example, the corner edges ED-P of the window WP may have a radius of curvature (hereinafter, referred to as a curvature radius), which is equal to or greater than about 0.1 millimeters (mm) and equal to or less than about 15 mm.

In an embodiment, each of the corner edges ED-P of the window WP may be a flat surface parallel to the plane defined by the first and second directional axes DR1 and DR2. However, the embodiment of the inventive concept is not limited thereto. In another embodiment, for example, the corner edges ED-P may include a portion bent in the direction of the fourth directional axis DR4. The corner edges ED-P may have one bent portion corresponding to a corner or two or four bent portions around corners.

The window WP may include the bending part BP bent with respect to the bending axis BX, and the curvature radius of the bending part BP may be equal to or greater than about 1 mm and equal to or less than about 10 mm. A curvature radius $R_I$ of the inner side WP-IS of the window may be less than a curvature radius $R_O$ of the outer side WP-OS of the window.

Although the bending axis BX is parallel to the direction of the second directional axis DR2, which is a direction of a short side (i.e., latitudinal side) of the window WP, in the window WP according to an embodiment in FIGS. 2A and 2B, the embodiment of the inventive concept is not limited thereto. Unlike as illustrated, the window WP according to another embodiment may include bending parts BP bent with respect to a bending axis BX parallel to the direction of the first directional axis DR1, which is a direction of a long side (i.e., longitudinal side) of the window. However, the embodiment of the inventive concept is not limited to the shape, which is illustrated in this specification, of the window WP according to an embodiment. In another embodiment, for example, a ratio between the long side and short side of the window may be changed unlike as illustrated.

Figure 3A:
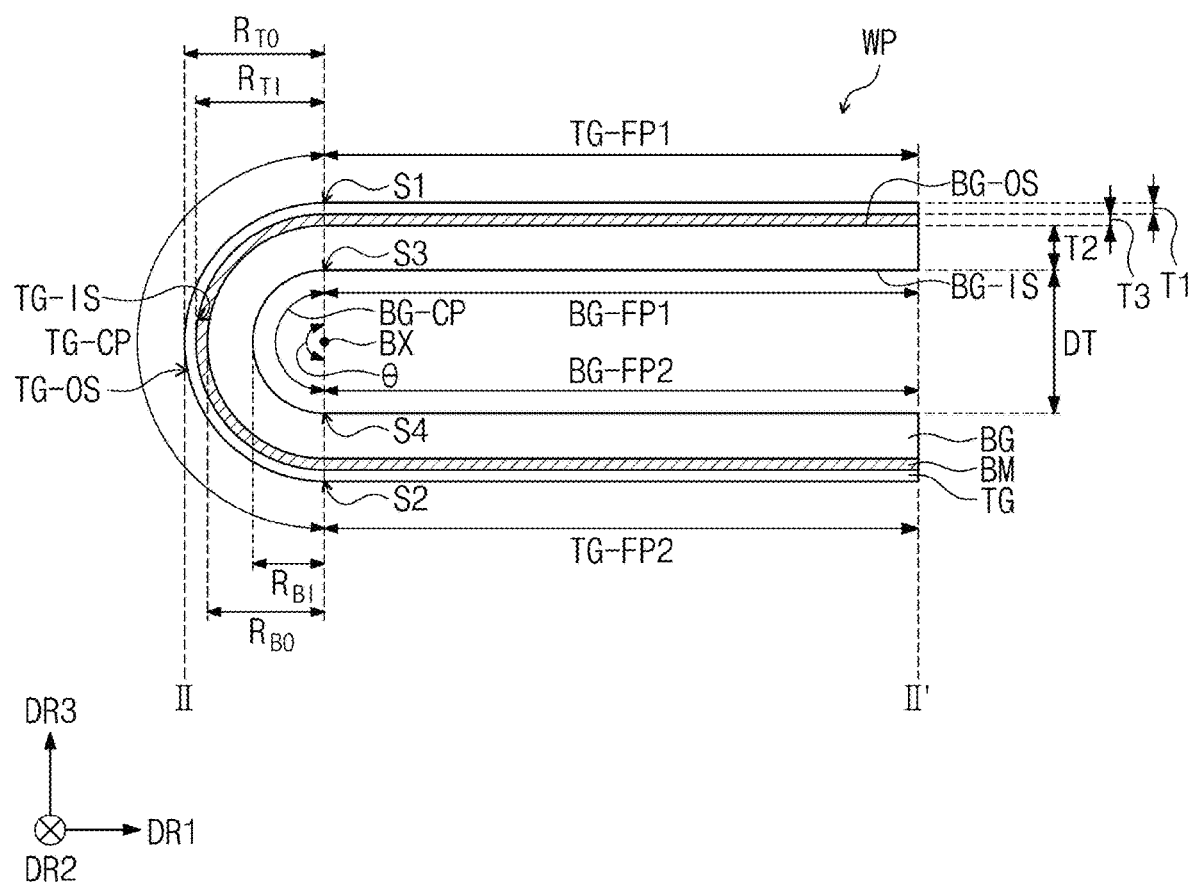
FIG. 3A is a cross-sectional view illustrating the window according to an embodiment and taken along line II-II' in FIG. 2A.
Figure 3B:
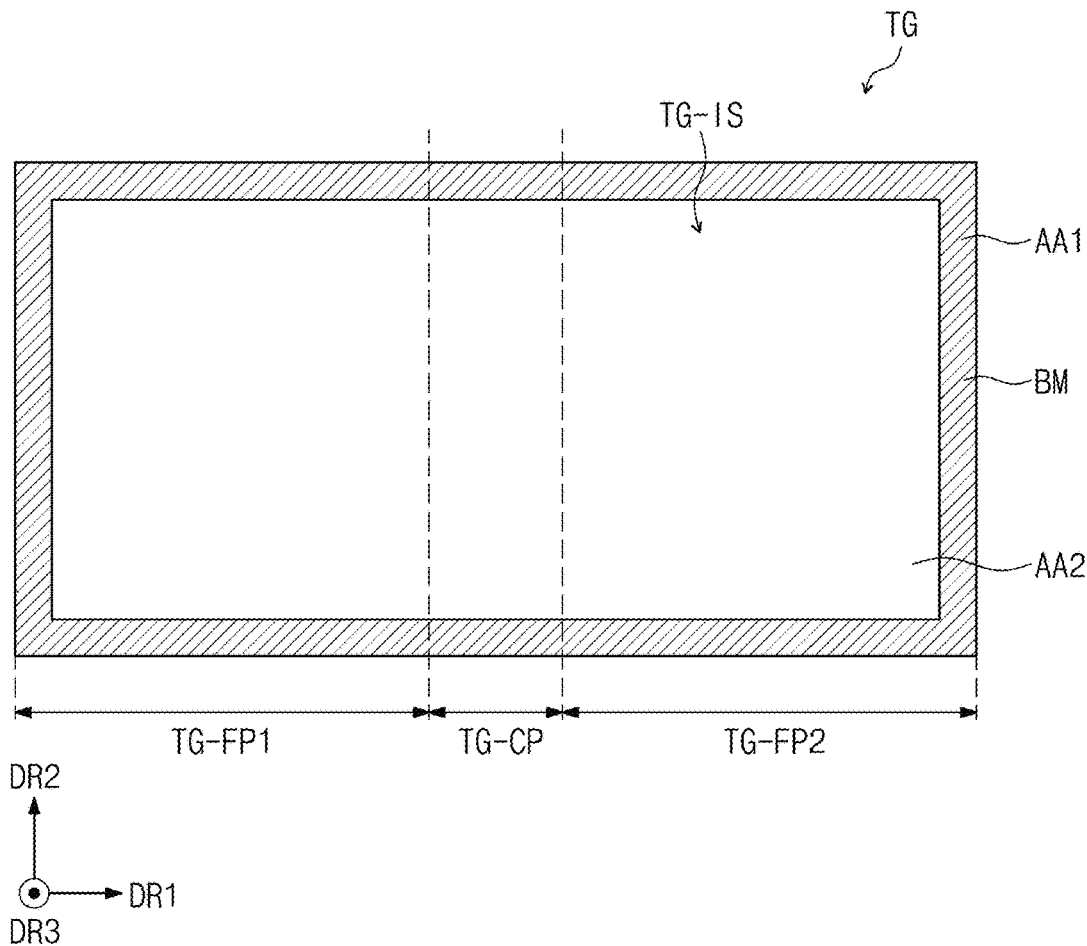
FIG. 3B is a plan view illustrating an unbent state of a first glass substrate on which a light shielding layer is disposed.
Figure 3C:
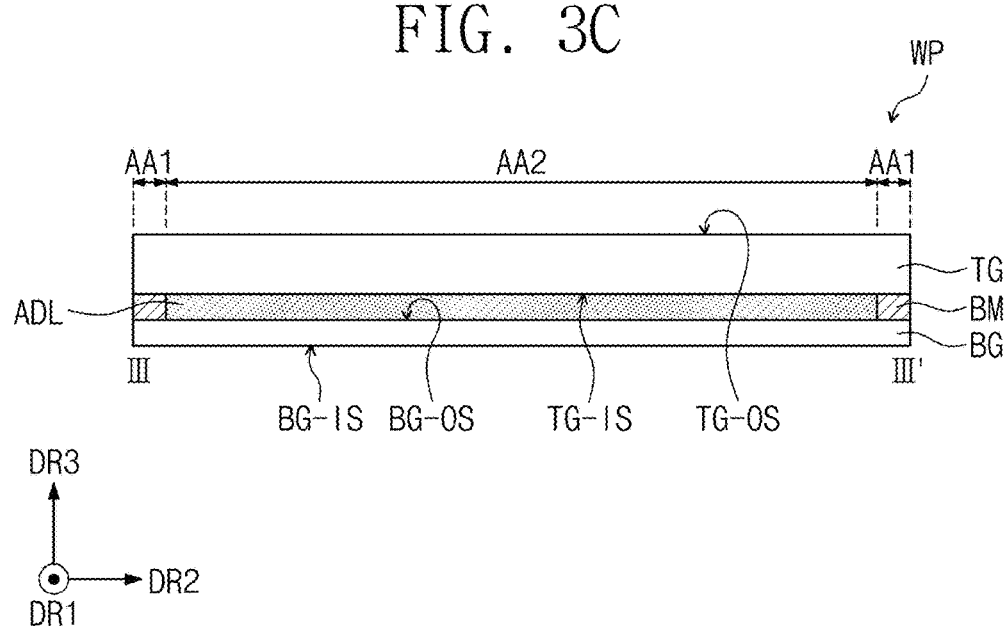
FIG. 3C is a cross-sectional view illustrating the window according to an embodiment and taken along line III-III' in FIG. 2A.

FIG. 3A is a cross-sectional view illustrating the window according to an embodiment and taken along line II-II' in FIG. 2A. FIG. 3B is a plan view illustrating an unbent state of a first glass substrate on which a light shielding layer is disposed. FIG. 3C is a cross-sectional view illustrating the window according to an embodiment and taken along line III-III' in FIG. 2A. Hereinafter, the window according to an embodiment will be described in detail with reference to FIGS. 3A to 3C.

Referring to FIGS. 3A and 3C, the window WP according to an embodiment may include a first glass substrate TG, a second glass substrate BG disposed at an inner side TG-IS of the first glass substrate TG, and a light shielding layer BM disposed between the first glass substrate TG and the second glass substrate BG or at an outer side BG-OS of the second glass substrate BG.

The first glass substrate TG may include a first flat part TG-FP1, a second flat part TG-FP2, and a first curved part TG-CP disposed between the first flat part TG-FP1 and the second flat part TG-FP2. That is, the first curved part TG-CP connects the first flat part TG-FP1 and the second flat part TG-FP2. The first flat part TG-FP1 and the second flat part TG-FP2 may be disposed in parallel to each other while facing each other. However, this is merely illustrative, and the embodiment of the inventive concept is not limited thereto. In another embodiment, for example, extension surfaces of the first flat part TG-FP1 and the second flat part TG-FP2 may not be parallel to each other. For example, a spaced distance between the first flat part TG-FP1 and the second flat part TG-FP2 may gradually increase or decrease in the first direction DR1.

The first curved part TG-CP may be disposed from a point S1 at which the first flat part TG-FP1 is initiated to a point S2 at which the second flat part TG-FP2 is initiated. A bending angle θ of the first glass substrate TG may be defined as an angle between the point S1 at which the first flat part TG-FP1 is initiated and the point S2 at which the second flat part TG-FP2 is initiated. The bending angle θ of the first glass substrate TG may be about 180°. However, this is merely illustrative, and the embodiment of the inventive concept is not limited thereto. In another embodiment, for example, the bending angle θ may be greater than about 120°.

The second glass substrate BG may include a third flat part BG-FP1, a fourth flat part BG-FP2, and a second curved part BG-CP disposed between the third flat part BG-FP1 and the fourth flat part BG-FP2. That is, the second curved part BG-CP connects the third flat part BG-FP1 and the fourth flat part BG-FP2. The third flat part BG-FP1 and the fourth flat part BG-FP2 may be disposed in parallel to each other while facing each other. However, this is merely illustrative, and the embodiment of the inventive concept is not limited thereto. In another embodiment, for example, extension surfaces of the third flat part BG-FP1 and the fourth flat part BG-FP2 may not be parallel to each other. For example, a spaced distance between the third flat part BG-FP1 and the fourth flat part BG-FP2 may gradually increase or decrease in the first direction DR1.

The second curved part BG-CP may be disposed from a point S3 at which the third flat part BG-FP1 is initiated to a point S4 at which the fourth flat part BG-FP2 is initiated. A bending angle θ of the second glass substrate BG may be defined as an angle between the point S3 at which the third flat part BG-FP1 is initiated and the point S4 at which the fourth flat part BG-FP2 is initiated. The bending angle θ of the second glass substrate BG may be about 180°. However, this is merely illustrative, and the embodiment of the inventive concept is not limited thereto. In another embodiment, for example, the bending angle θ may be greater than about 120°.

The first curved part TG-CP may have an outer curvature radius $R_{TO}$ and an inner curvature radius $R_{TI}$. The outer curvature radius $R_{TO}$ of the first curved part TG-CP may be greater than the inner curvature radius $R_{TI}$ of the first curved part TG-CP. The second curved part BG-CP may have an outer curvature radius $R_{BO}$ and an inner curvature radius $R_{BI}$. The outer curvature radius $R_{BO}$ of the second curved part BG-CP may be greater than the inner curvature radius $R_{BI}$ of the second curved part BG-CP.

A first thickness T1 of the first glass substrate TG in a thickness direction (i.e., the third direction DR3) may be less than a second thickness T2 of the second glass substrate BG. The first glass substrate TG may have the thickness T1 in a range from about 20 micrometers (μm) to about 100 μm. The second glass substrate BG may have the second thickness T2 in a range from about 100 μm to about 1000 μm.

The second glass substrate BG may be manufactured through thermal molding so that the second glass substrate BG is bent and fixed to have a large bending angle. In the thermal molding process, a dent or a projection may be generated on a surface of the second glass substrate BG. In general, the dent or the projection generated on the surface of the glass substrate may be removed through a separate polishing process. However, as the thin first glass substrate TG is disposed at an outer side BG-OS of the second glass substrate BG, roughness of the surface may improve without a separate polishing process even though the dent or the projection is generated. Also, the first glass substrate TG may protect the second glass substrate BG disposed at the inner side TG-IS of the first glass substrate TG from an external impact.

The inner side TG-IS of the first glass substrate TG may contact the outer side BG-OS of the second glass substrate BG. The inner curvature radius $R_{TI}$ of the first curved part TG-CP may be equal to or greater than the outer curvature radius $R_{BO}$ of the second curved part BG-CP. The inner curvature radius $R_{BI}$ of the second curved part BG-CP may be in a range from about 1 mm to about 10 mm. A distance DT in a direction in which the third flat part BG-FP1 faces the fourth flat part BG-FP2 may be in a range from about 6 mm to about 8 mm.

The light shielding layer BM may be disposed between the first glass substrate TG and the second glass substrate BG. That is, the light shielding layer BM may contact the inner side TG-IS of the first glass substrate TG and the outer side BG-OS of the second glass substrate BG.

That is, the light shielding layer BM may contact the inner side TG-IS of the first glass substrate TG and the outer side BG-OS of the second glass substrate BG. Each of the first glass substrate TG and the second glass substrate BG may include a first area AA1 overlapping the light shielding layer BM and a second area AA2 that is not in overlap with the light shielding layer BM in a plan view. On a plane, the first area AA1 may surround the second area AA2. The first area AA1 may have a planar area less than that of the second area AA2. The light shielding layer BM may have a third thickness T3 in a range from about 5 μm to about 10 μm.

The window WP according to an embodiment may further include an adhesive layer ADL disposed between the first glass substrate TG and the second glass substrate BG. The adhesive layer ADL may overlap the second area AA2 of the first glass substrate TG and the second area AA2 of the second glass substrate BG in a plan view.

Figure 4A:
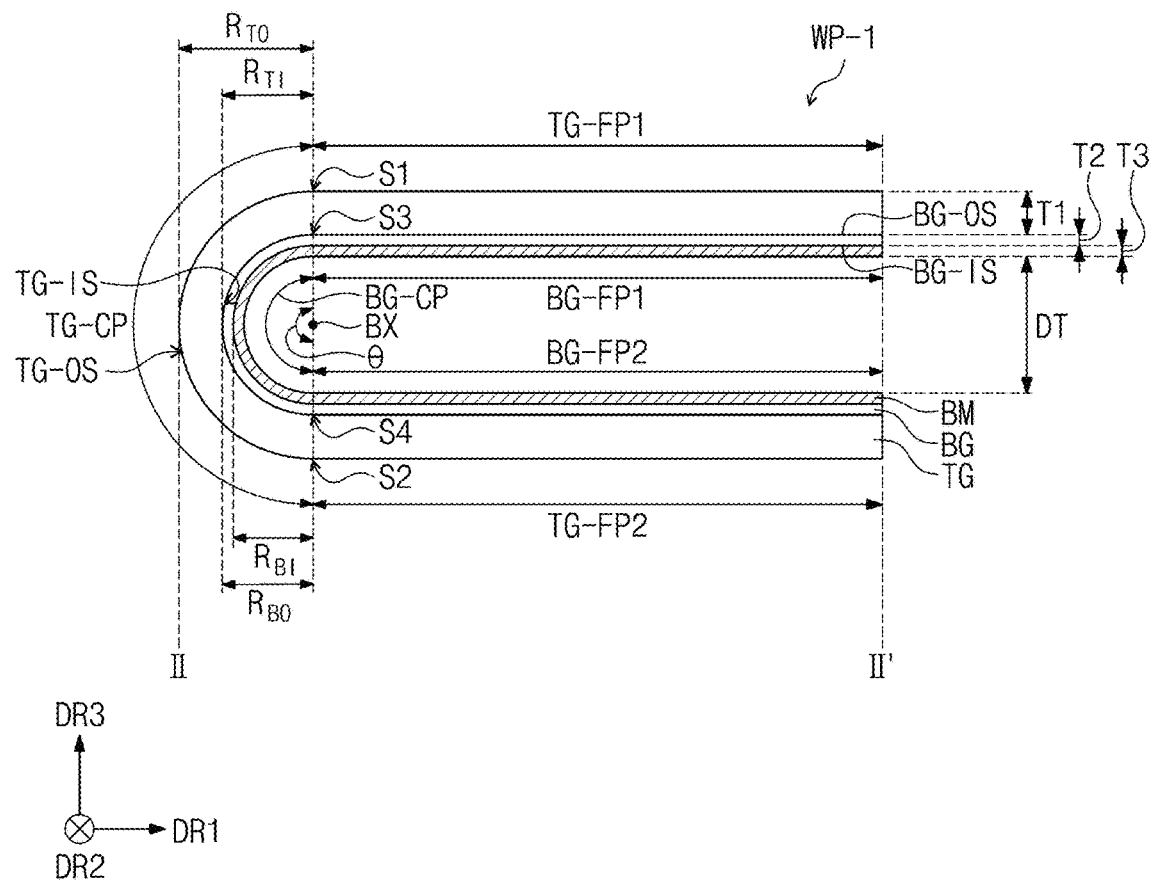
FIG. 4A is a cross-sectional view illustrating a window according to another embodiment and taken along line II-II' in FIG. 2A.
Figure 4B:
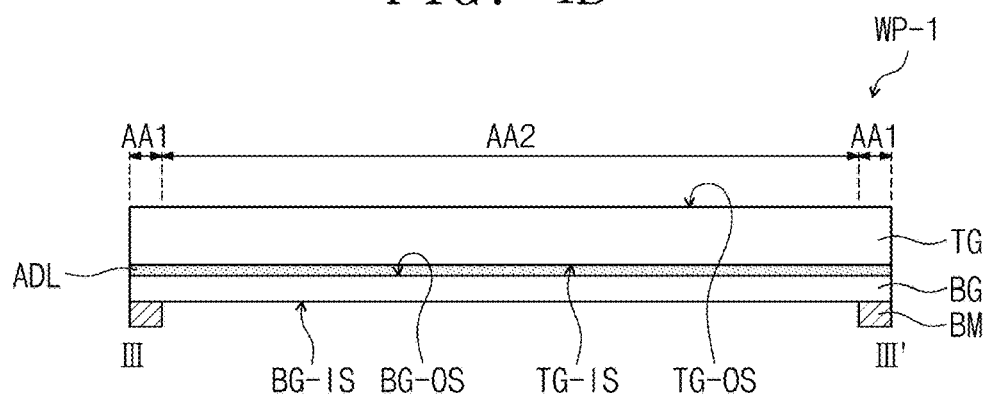
FIG. 4B is a cross-sectional view illustrating the window according to another embodiment and taken along line III-III' in FIG. 2A.

FIG. 4A is a cross-sectional view illustrating a window according to another embodiment and taken along line II-II' in FIG. 2A. FIG. 4B is a cross-sectional view illustrating the window according to another embodiment and taken along line III-III' in FIG. 2A. Hereinafter, a window WP-1 according to an embodiment will be described in detail with reference to FIGS. 4A and 4B. The same features as those described with reference to FIGS. 1 to 3C will be omitted, and different points will be mainly described.

The window WP-1 in FIGS. 4A and 4B is different from the window WP in FIGS. 3A to 3C in that a light shielding layer BM is disposed at an inner side BG-IS of a second glass substrate BG.

Referring to FIGS. 4A and 4B, the window WP-1 according to an embodiment may include the light shielding layer BM disposed at the inner side BG-IS of the second glass substrate BG. Also, on a cross-sectional view, the second glass substrate BG may be disposed on the light shielding layer BM, and a first glass substrate TG may be disposed on the second glass substrate BG.

A first thickness T1 of the first glass substrate TG may be greater than a second thickness T2 of the second glass substrate BG. The first glass substrate TG may have the first thickness T1 in a range from about 100 μm to about 1000 μm. The second glass substrate BG may have the second thickness T2 in a range from about 20 μm to about 100 μm. As the thin second glass substrate BG is disposed at the inner side TG-IS of the first glass substrate TG, a roughness defect caused by a dent or a projection generated on the inner side TG-IS of the first glass substrate TG may improve.

Each of the first glass substrate TG and the second glass substrate BG may include a first area AA1 overlapping the light shielding layer BM and a second area AA2 that is not in overlap with the light shielding layer BM in a plan view. When the light shielding layer is disposed at the entire inner side BG-IS of the second glass substrate BG unlike this embodiment, the display module DM (refer to FIG. 1C) may not be attached to the inner side BG-IS of the second glass substrate BG due to a surface property of the light shielding layer. However, in this embodiment, as the light shielding layer BM is disposed at only an edge of the inner side BG-IS of the second glass substrate BG, the second glass substrate BG and the display module DM (refer to FIG. 1C) may be directly attached in the second area AA2 in which the light shielding layer BM is not disposed to improve an adhesive force therebetween.

The window WP-1 according to an embodiment may further include an adhesive layer ADL disposed between the first glass substrate TG and the second glass substrate BG. The adhesive layer ADL may overlap an entire surface of each of the first glass substrate TG and the second glass substrate BG.

Although only two glass substrates TG and BG are bonded in the window WP and WP-1 in FIGS. 3A to 4B, the embodiment of the inventive concept is not limited thereto. Although not shown, the window according to an embodiment may include a single-layered glass substrate including a light shielding layer disposed at an edge thereof, and the glass substrate may include a first area overlapping the light shielding layer and a second area that is not in overlap with the light shielding layer.

Figure 5:
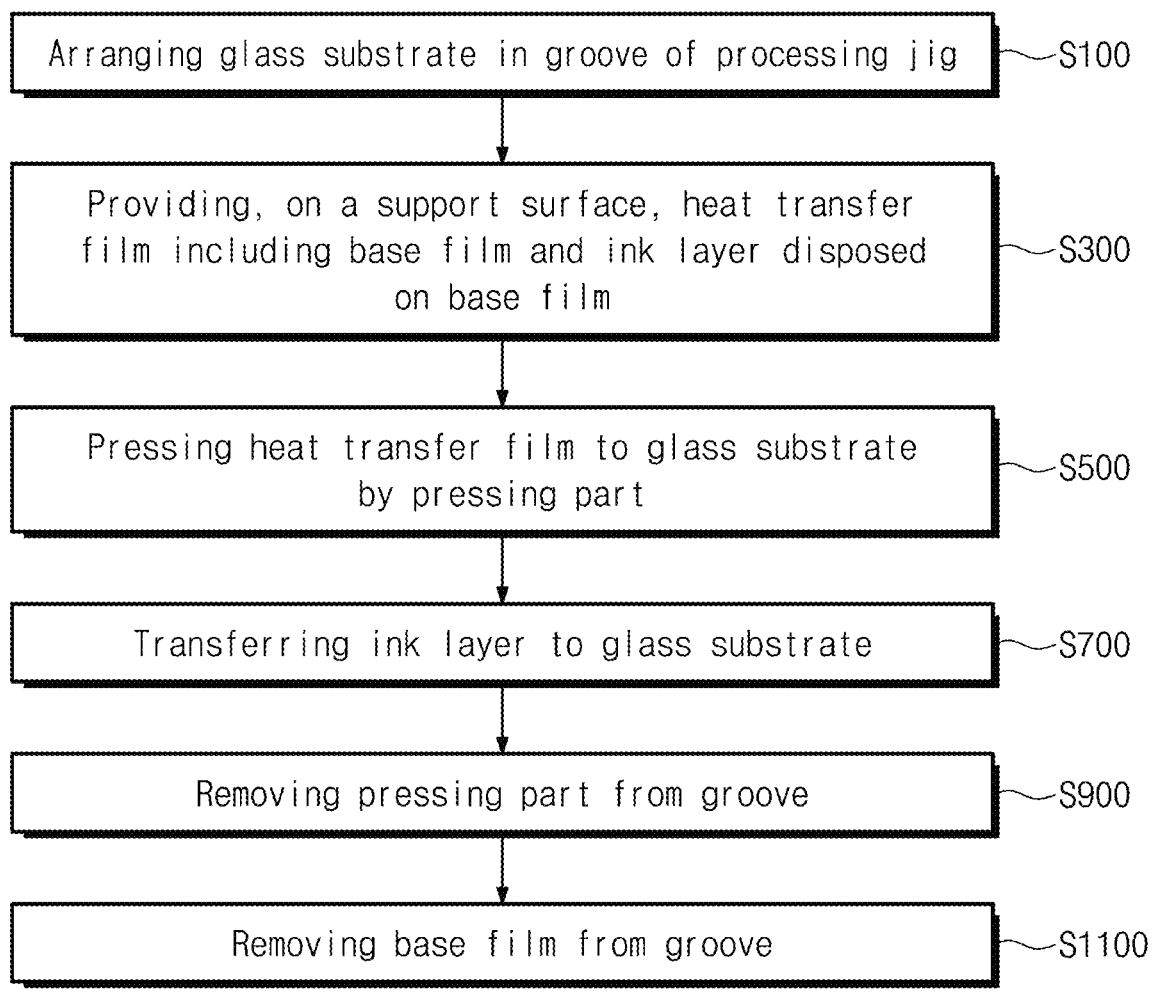
FIG. 5 is a flowchart representing a method for manufacturing the window according to an embodiment.
Figure 6A:
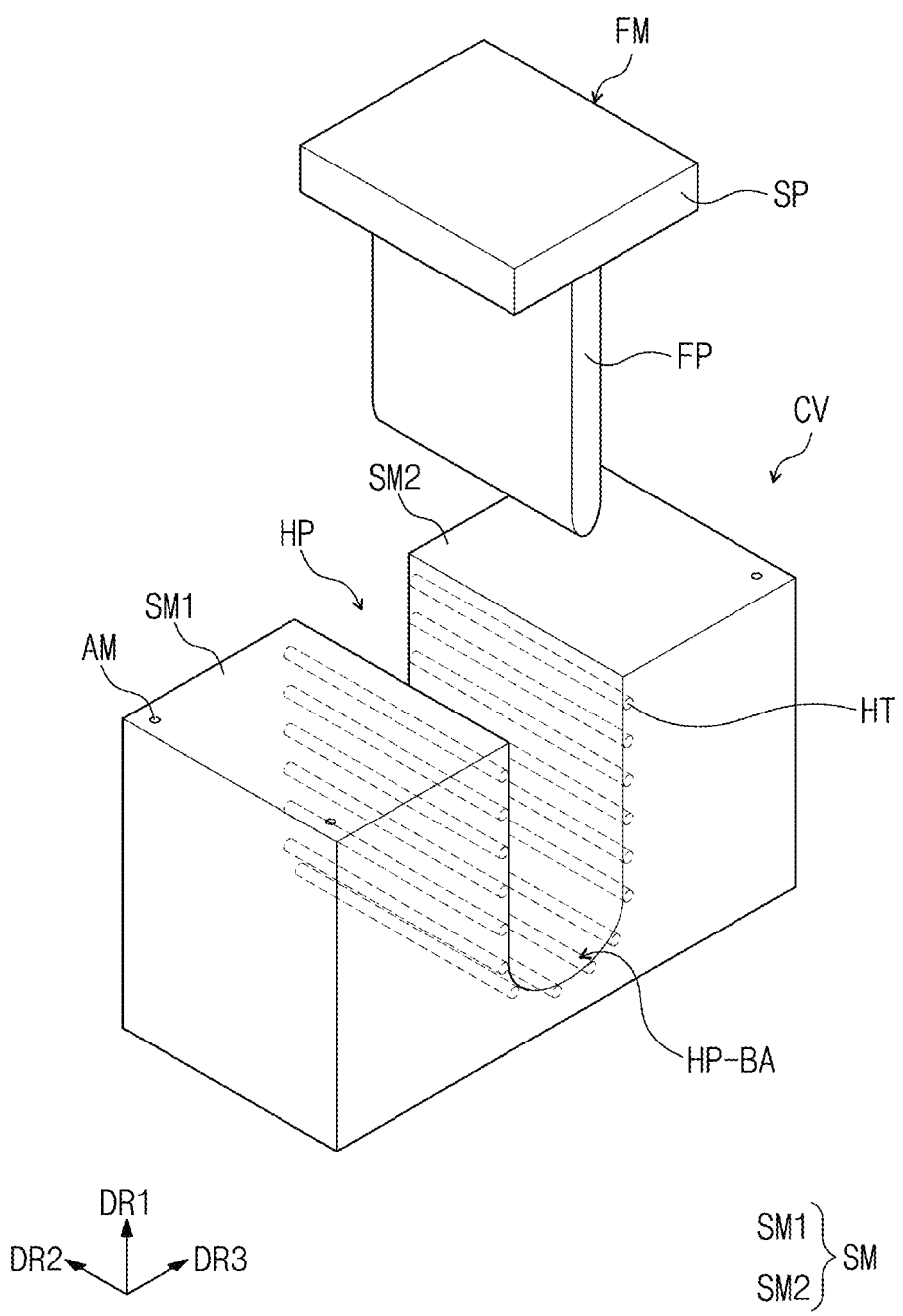
FIG. 6A is a perspective view illustrating a window processing apparatus used in the method for manufacturing the window according to an embodiment.
Figure 6B:
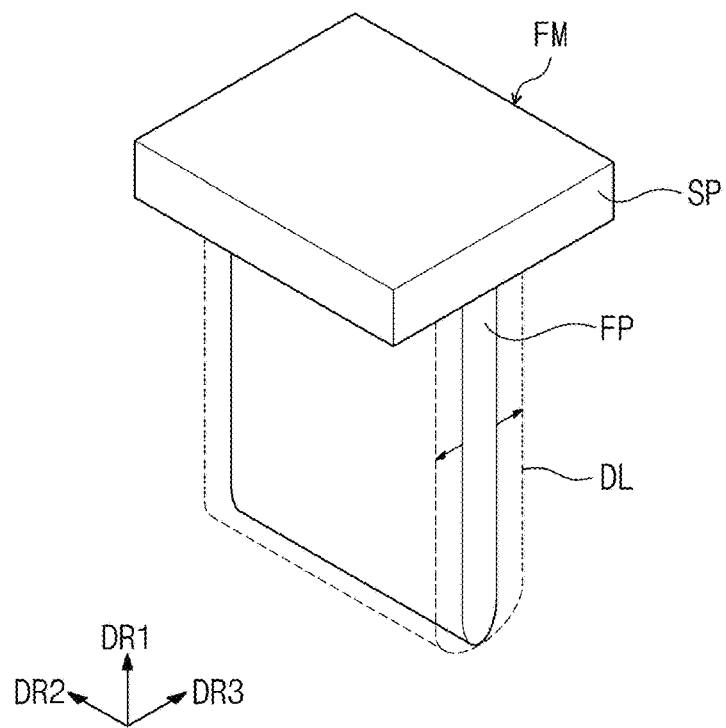
FIG. 6B is a perspective view illustrating a pressing part of the window processing apparatus used in the method for manufacturing the window according to an embodiment.
Figure 6C:
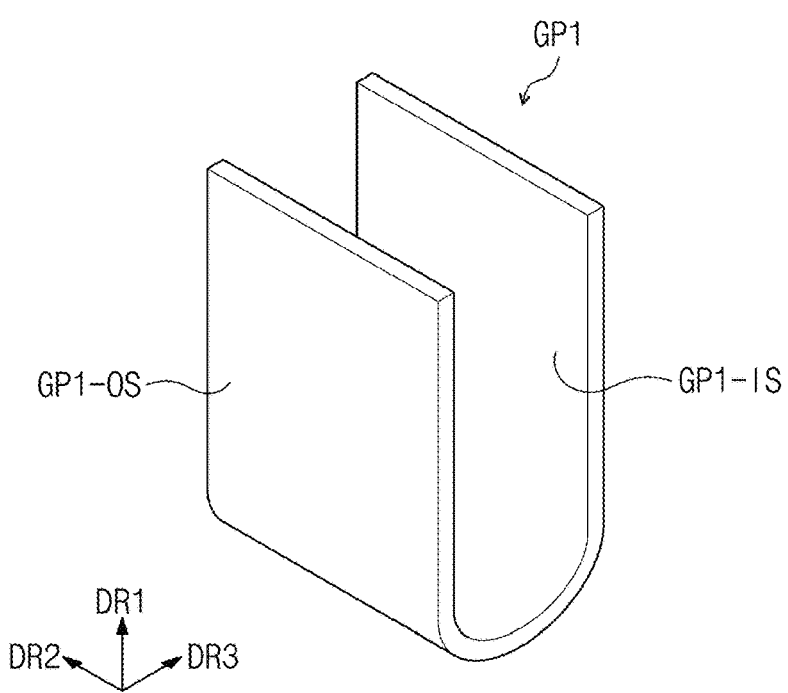
FIG. 6C is a perspective view illustrating a glass substrate used in the method for manufacturing the window according to an embodiment.
Figure 6D:
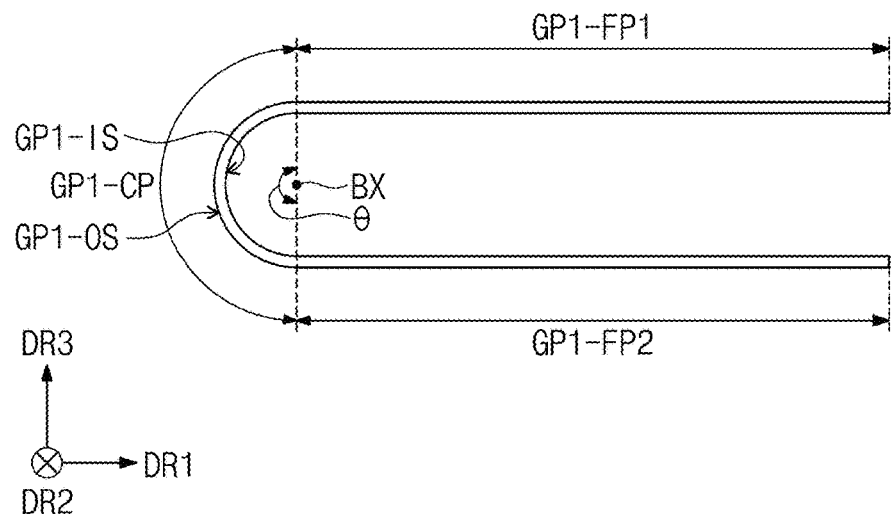
FIG. 6D is a side view illustrating the glass substrate used in the method for manufacturing the window according to an embodiment.
Figure 6E:
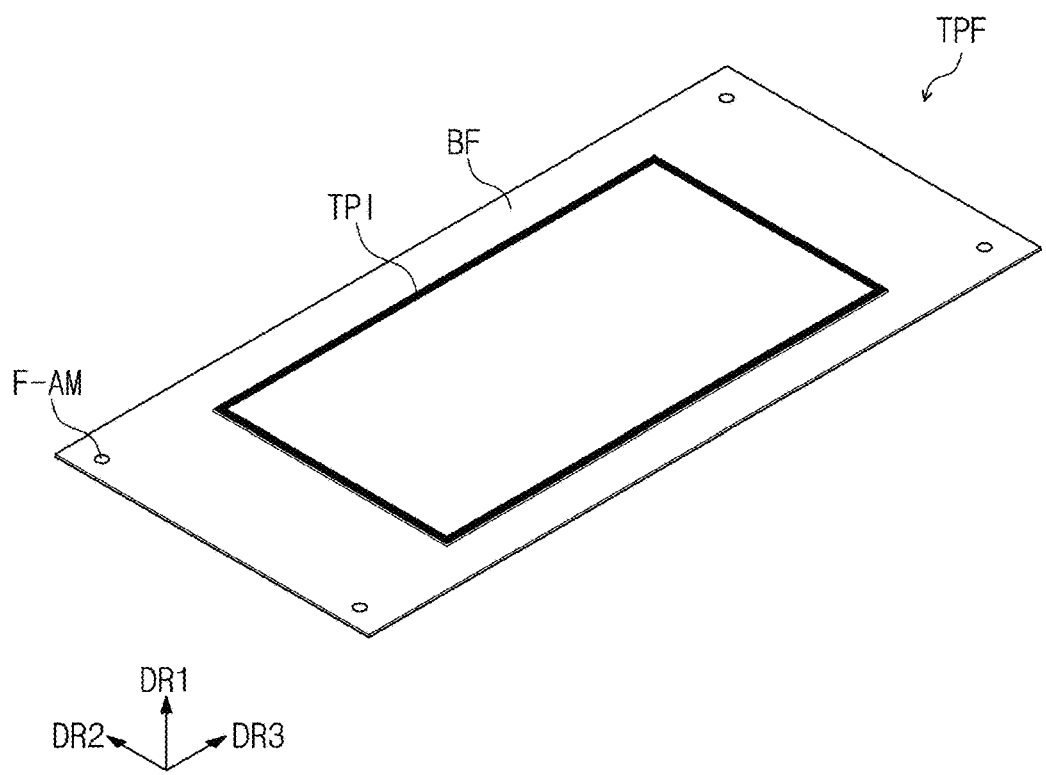
FIG. 6E is a perspective view illustrating a thermal transfer film used in the method for manufacturing the window according to an embodiment.

Hereinafter, a method for manufacturing the window according to an embodiment will be described in detail with reference to FIGS. 5 to 16. The same features as those described with reference to FIGS. 1 to 4B will be omitted, and only characteristics of the manufacturing method will be mainly described FIG. 5 is a flowchart representing a method for manufacturing the window according to an embodiment. FIG. 6A is a perspective view illustrating a window processing apparatus used in the method for manufacturing the window according to an embodiment. FIG. 6B is a perspective view illustrating a pressing part of the window processing apparatus used in the method for manufacturing the window according to an embodiment. FIG. 6C is a perspective view illustrating a glass substrate used in the method for manufacturing the window according to an embodiment. FIG. 6D is a side view illustrating the glass substrate used in the method for manufacturing the window according to an embodiment. FIG. 6E is a perspective view illustrating a heat transfer film used in the method for manufacturing the window according to an embodiment. FIGS. 7 to 13 are views illustrating each process of the method for manufacturing the window according to an embodiment.

Referring to FIG. 5, the method for manufacturing the window according to an embodiment includes: a process S100 of arranging a glass substrate in a groove of a processing jig; a process S300 of providing a heat transfer film including a base film and an ink layer disposed on the base film on a support surface; a process S500 of pressing the heat transfer film to the glass substrate by a pressing part; a process S700 of transferring the ink layer to the glass substrate; a process S900 of removing the pressing part from the groove; and a process S1100 of removing the base film from the groove.

Referring to FIGS. 6A and 6B, the window processing apparatus used in the method for manufacturing the window according to an embodiment includes a processing jig CV and a pressing part FM. The processing jig CV may include a support surface SM, a groove HP recessed from the support surface SM, and a heating part HT disposed in the groove HP. The support surface SM may include a first support surface SM1 and a second support surface SM2, which are spaced apart from each other in the third direction DR3 with the groove HP therebetween. The pressing part FM may be disposed above the processing jig CV and controlled in operation in a vertical direction. The pressing part FM may include a support SP and a head FP protruding from one surface of the support SP. In the pressing part FM, the head FP may be expanded while a volume of the support SP is maintained. The head FP may be expanded in volume until a dotted line DL. The head FP may be expanded by injecting air into the head FP. Although an air injection part is not illustrated, the air injection part may be connected to the support SP to inject air into the head FP or connected directly to the head FP to inject air into the head FP.

However, the embodiment of the inventive concept is not limited to the ratio of sizes of members of the window processing apparatus according to an embodiment illustrated in this specification. For example, a ratio between a height and a width of each of the processing jig CV and the pressing part FM and a height ratio between the processing jig CV and the groove HP may be varied unlike as illustrated.

Referring to FIGS. 6C and 6D, a glass substrate GP1 used in the method for manufacturing the window according to an embodiment may include a first flat part GP1-FP1, a second flat part GP1-FP2, and a first curved part GP1-CP disposed between the first flat part GP1-FP1 and the second flat part GP1-FP2. The glass substrate GP1 may be fixed in a bent state to have a large bending angle and distinguished into an inner side GP1-IS and an outer side GP1-OS.

Referring to FIG. 6E, a heat transfer film TPF used in the method for manufacturing the window according to an embodiment may include a base film BF, an ink layer TPI disposed on the base film BF, and alignment marks F-AM spaced apart from each other in the third direction DR3 with the ink layer TPI therebetween. When the heat transfer film TPF is arranged so that the ink layer TPI contacts an object to be transferred (hereinafter, referred to as a transfer target) and then heated, the ink layer TPI may be transferred to the transfer target. Although not shown, the base film BF may have a thickness in a range from about 25 μm to about 50 μm, and the ink layer TPI may have a thickness in a range from about 5 μm to about 10 μm.

Figure 7:
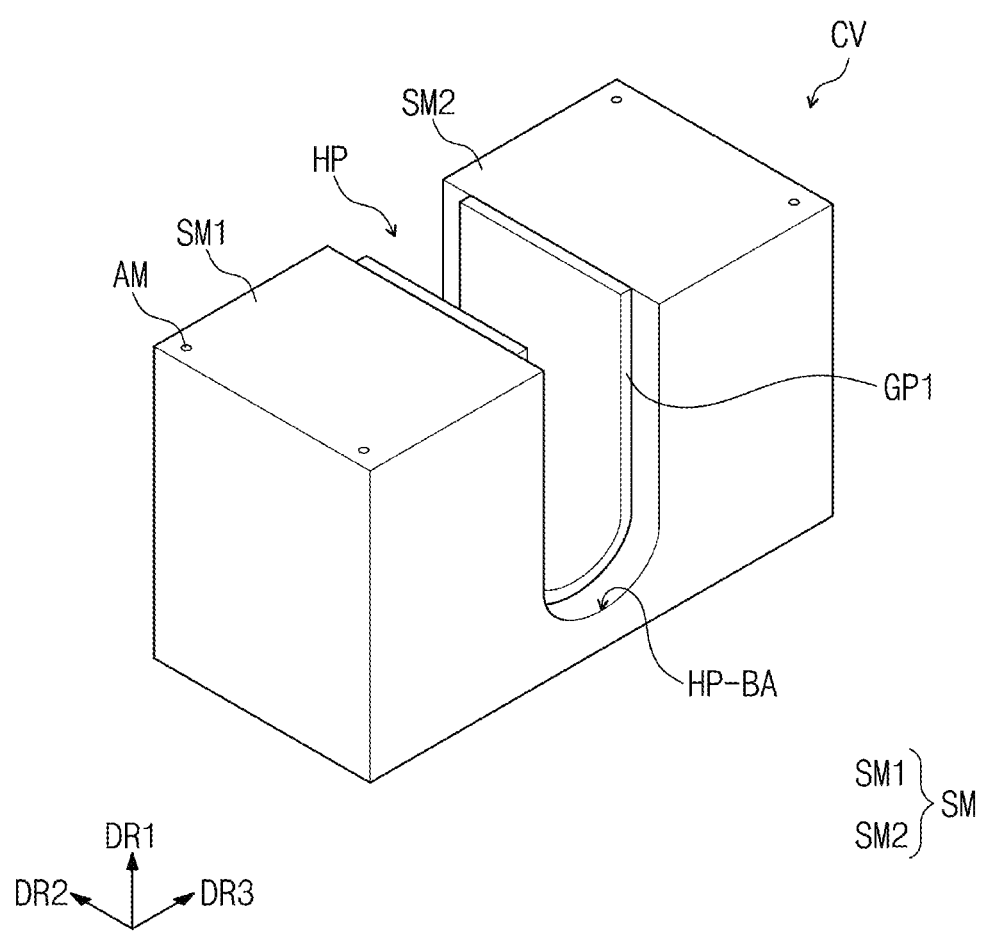
FIG. 7 is a perspective view illustrating one process of the method for manufacturing the window according to an embodiment.

FIG. 7 is a perspective view illustrating a state in which the glass substrate GP1 is disposed in the groove HP of the processing jig CV. Referring to FIG. 7, the process S100 of arranging the glass substrate GP1 in the groove HP of the processing jig CV may arrange the glass substrate GP1 so that the outer side GP1-OS (refer to FIG. 6C) of the glass substrate GP1 contacts a bottom surface HP-BA of the groove HP of the processing jig CV. As the glass substrate GP1 contacts the bottom surface HP-BA of the groove HP, the glass substrate GP1 may maintain a fixed state in the process S500 of pressing the heat transfer film TPF to the glass substrate GP1 by the pressing part FM. Although a width of the glass substrate GP1 in the second direction DR2 is less than that of the groove HP in the second direction DR2 on the drawing, this is merely illustrative. In an embodiment, the width of the glass substrate GP1 in the second direction DR2 may be equal to that of the groove HP in the second direction DR2.

In an embodiment, the width of the glass substrate GP1 in the third direction DR3 may be equal to that of the groove HP in the third direction DR3. However, this is merely illustrative. In an embodiment, the width of the glass substrate GP1 in the third direction DR3 may be greater or less than that of the groove HP in the third direction DR3.

Figure 8:
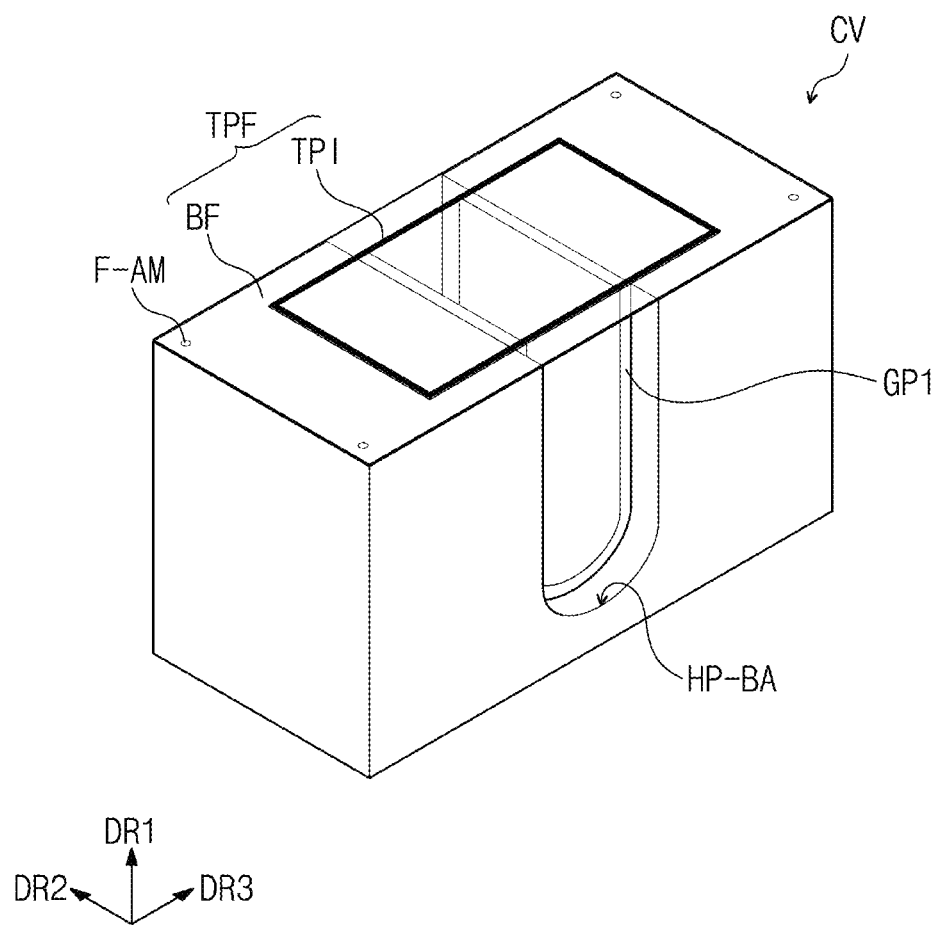
FIG. 8 is a perspective view illustrating one process of the method for manufacturing the window according to an embodiment.

FIG. 8 is a perspective view illustrating a state in which the heat transfer film TPF is disposed on the support surface SM of the processing jig CV. Referring to FIG. 8, the process S300 of providing the heat transfer film TPF including the base film BF and the ink layer TPI disposed on the base film BF on the support surface SM matches a first alignment mark AM provided on the support surface SM with a second alignment mark F-AM provided on the base film BF. The heat transfer film TPF may be provided so that the ink layer TPI faces the support surface SM.

Figure 9A:
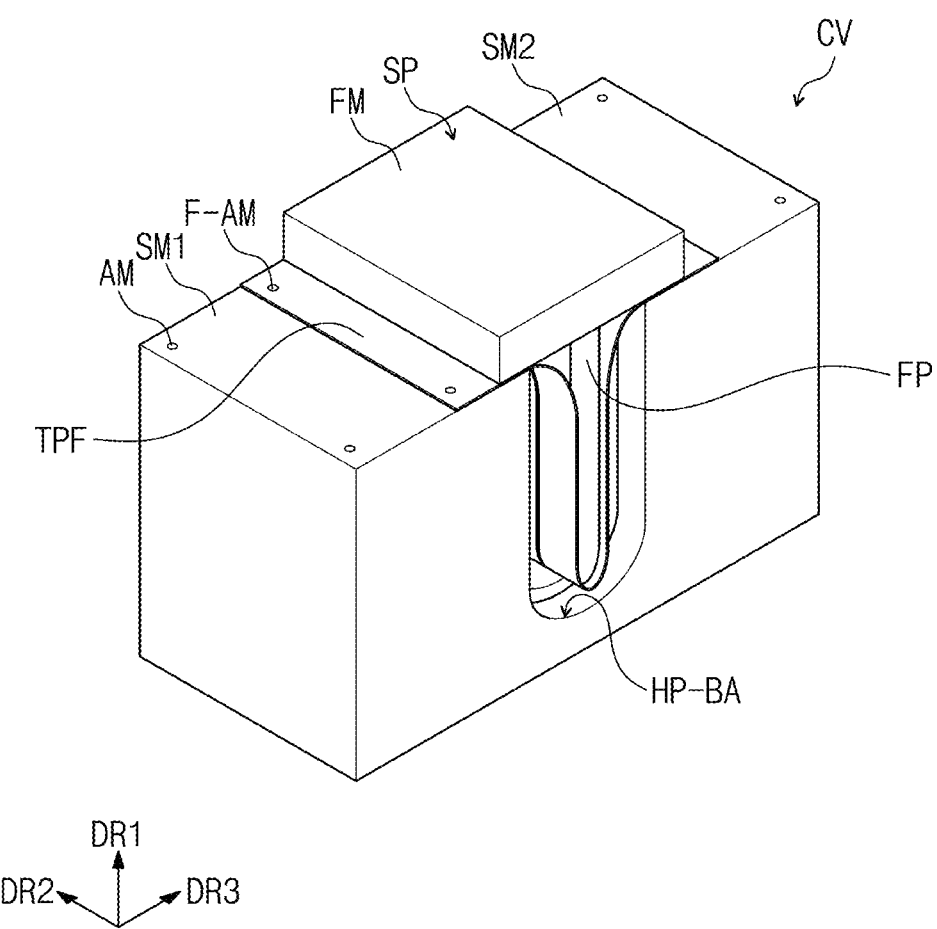
FIG. 9A is a perspective view illustrating one process of the method for manufacturing the window according to an embodiment.
Figure 9B:
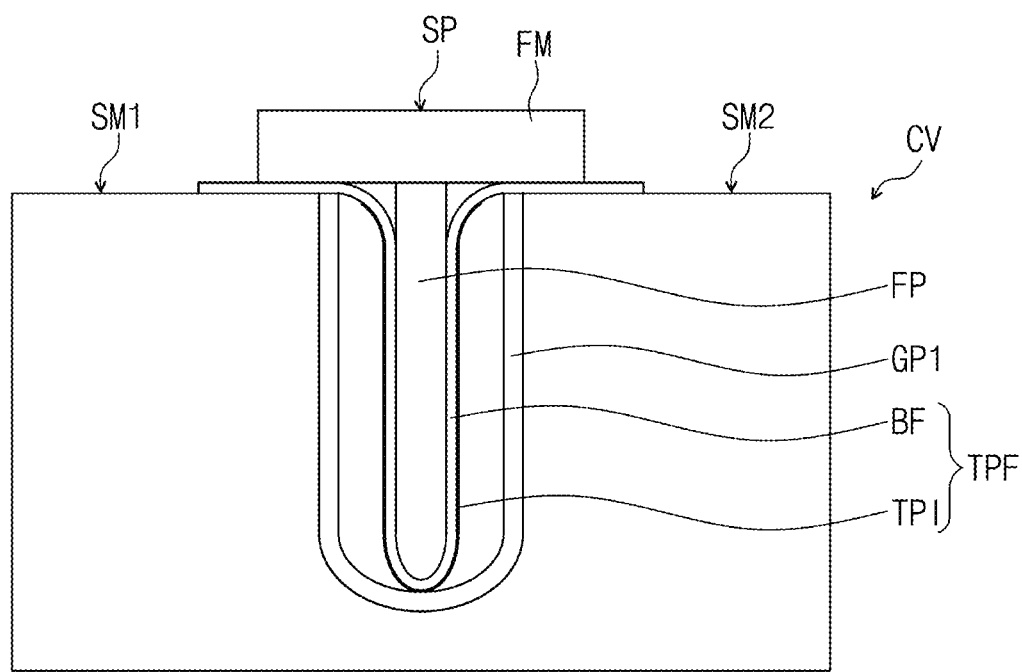
FIG. 9B is a perspective view illustrating one process of the method for manufacturing the window according to an embodiment.
Figure 10A:
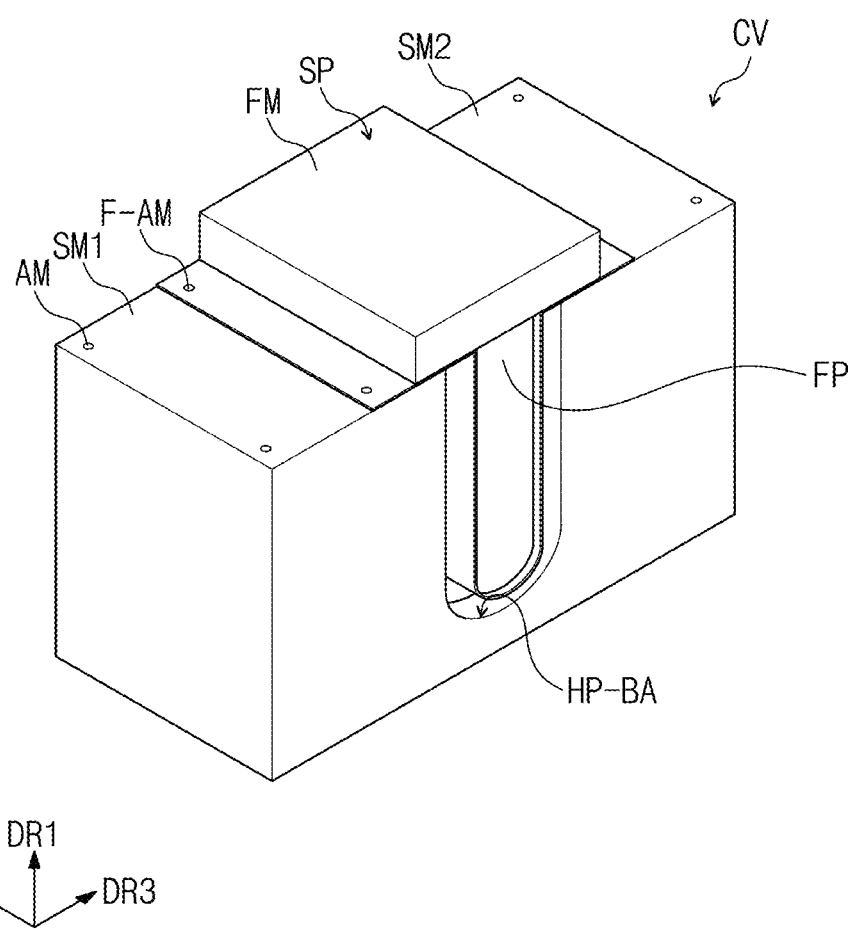
FIG. 10A is a perspective view illustrating one process of the method for manufacturing the window according to an embodiment.
Figure 10B:
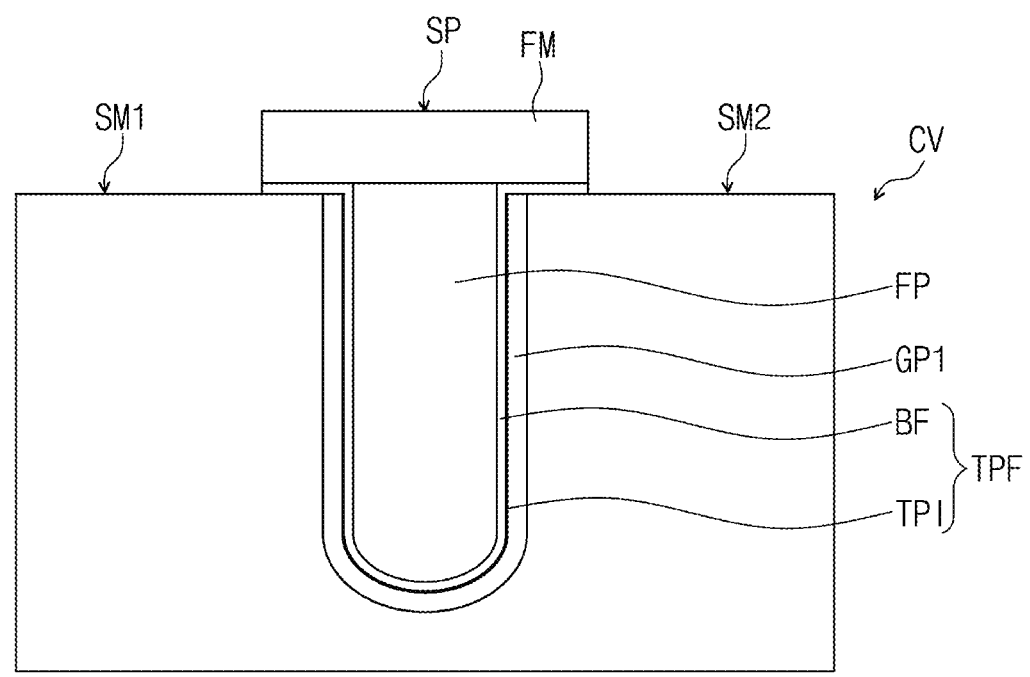
FIG. 10B is a perspective view illustrating one process of the method for manufacturing the window according to an embodiment.

FIG. 9A is a perspective view illustrating a state in which the head FP of the pressing part FM is inserted to the groove HP. FIG. 9B is a front view illustrating the state in which the head FP of the pressing part FM is inserted to the groove HP. FIG. 10A is a perspective view illustrating a state in which the head FP inserted to the groove HP is expanded. FIG. 10B is a front view illustrating the state in which the head FP inserted to the groove HP is expanded. Referring to FIGS. 9A to 10B, the process S500 of pressing the heat transfer film TPF to the glass substrate GP1 by the pressing part FM may include a process of inserting the head FP to the groove HP by moving the pressing part FM downward and arranging the support SP on the support surface SM and a process of expanding the head FP. As the pressing part FM is moved downward toward the groove HP, an area in which the heat transfer film TPF covers the support surface SM may decrease. When the support SP of the pressing part FM contacts the support surface SM, the head FP of the pressing part FM may be disposed adjacent to the first curved part GP1-CP, and the heat transfer film TPF may contact the bottom surface HP-BA of the groove HP.

The process of expanding the pressing part FM may press the heat transfer film TPF to the glass substrate GP1 by expanding the pressing part FM. As the heat transfer film TPF is pressed toward the glass substrate GP1, an area in which the heat transfer film TPF covers the inner side GP1-IS (refer to FIG. 6D) of the glass substrate GP1 may increase. The ink layer TPI may be disposed between the base film BF and the glass substrate GP1. The process of expanding the pressing part FM may include a process of supplying air to the head FP of the pressing part FM.

Figure 11:
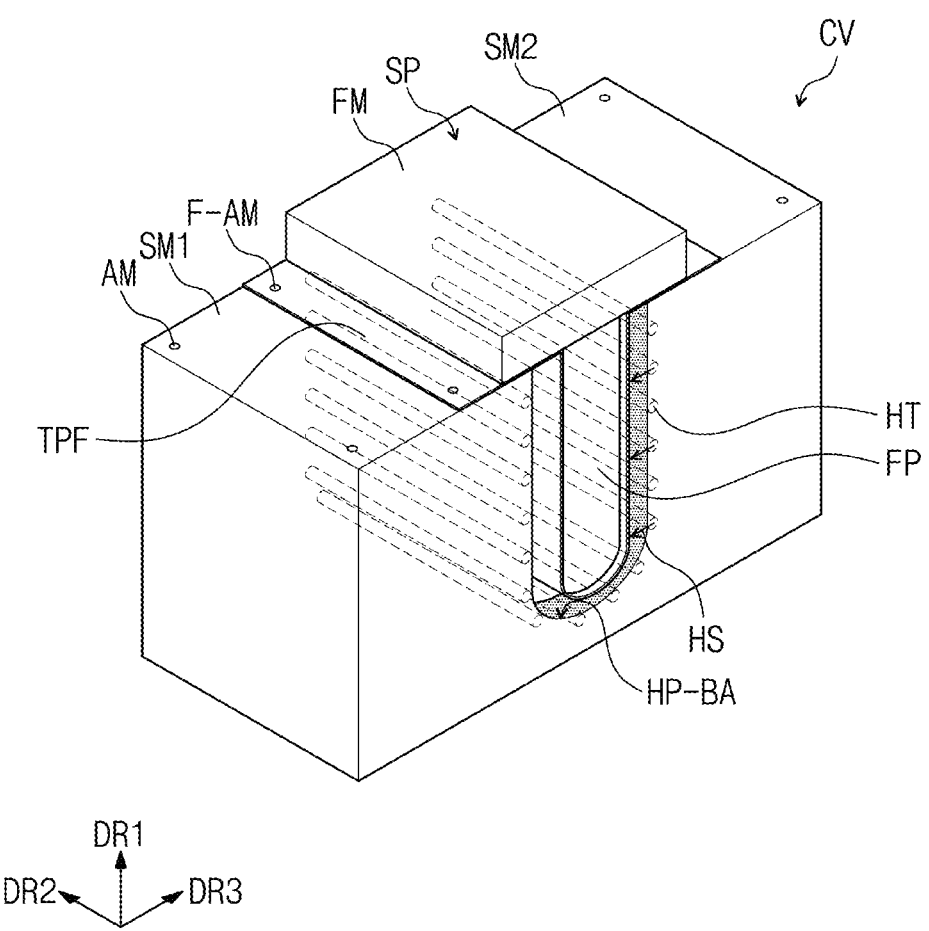
FIG. 11 is a perspective view illustrating one process of the method for manufacturing the window according to an embodiment.

FIG. 11 is a perspective view illustrating a state in which the heating part HT disposed in the groove HP is heated. Referring to FIG. 11, the process S700 of transferring the ink layer TPI to the glass substrate GP1 may thermally transfer the ink layer TPI to a surface of the inner side GP-IS of the glass substrate GP1 by heating the heating part HT. The process of transferring the ink layer TPI to the glass substrate GP1 may include a process of heating the heating part HT in a range from about 100 degrees in Celsius (° C.) to about 200° C. When heated less than about 100° C., the thermal transferring of the ink layer TPI may not be generated, and when heated greater than about 200° C., the base film BF may be damaged. The heating part HT may transfer heat HS to the glass substrate GP1, the ink layer TPI, and the heat transfer film BF, which are disposed in the groove HP.

Figure 12:
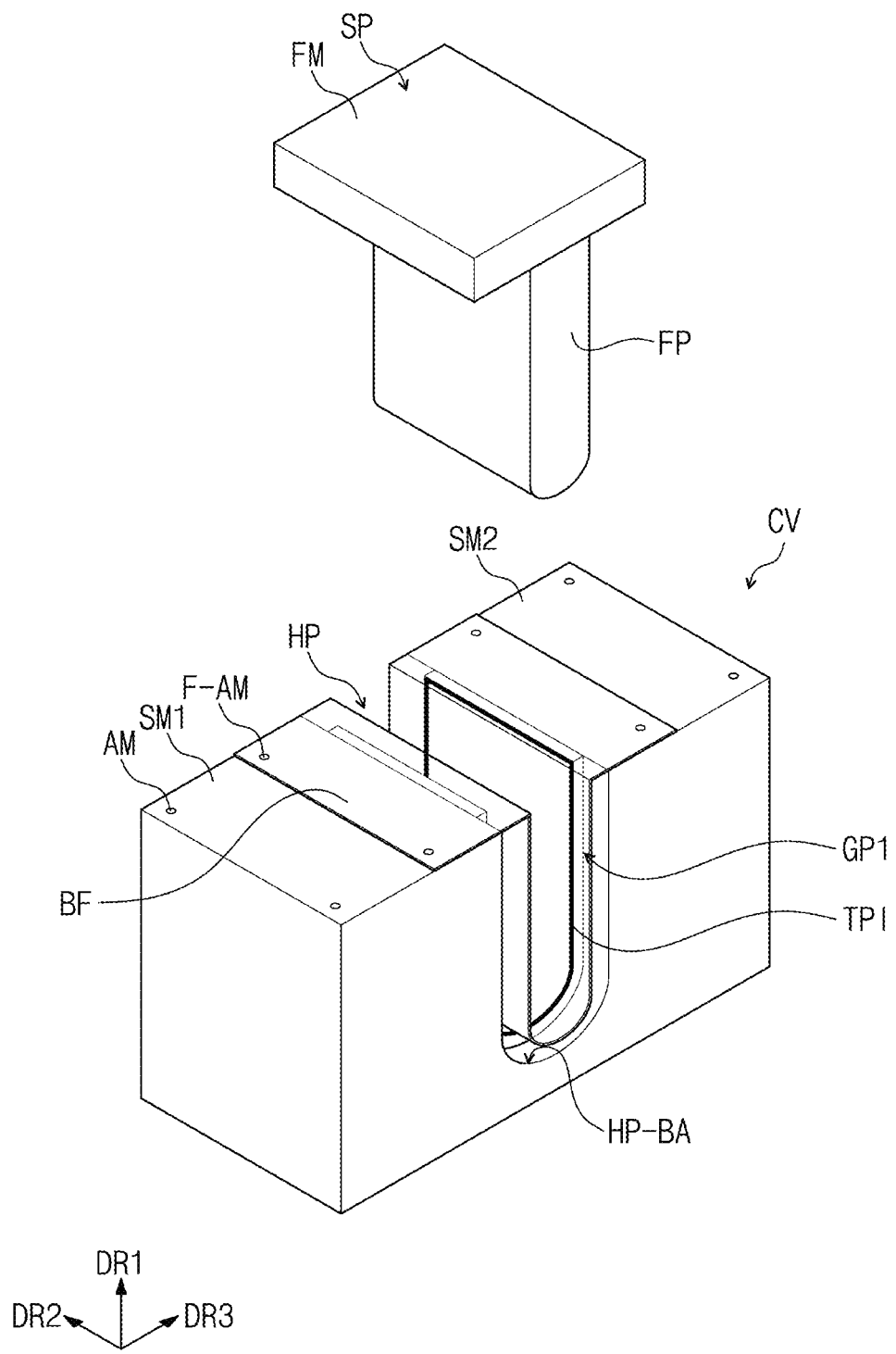
FIG. 12 is a perspective view illustrating one process of the method for manufacturing the window according to an embodiment.

FIG. 12 is a perspective view illustrating a state in which the pressing part FM is removed from the groove HP. Referring to FIG. 12, the process S900 of removing the pressing part FM from the groove HP may remove the pressing part FM from the groove HP by moving the pressing part FM upward. Although not show, the process S900 of removing the pressing part FM from the groove HP may include a process of contracting the head FP of the pressing part FM.

Figure 13:
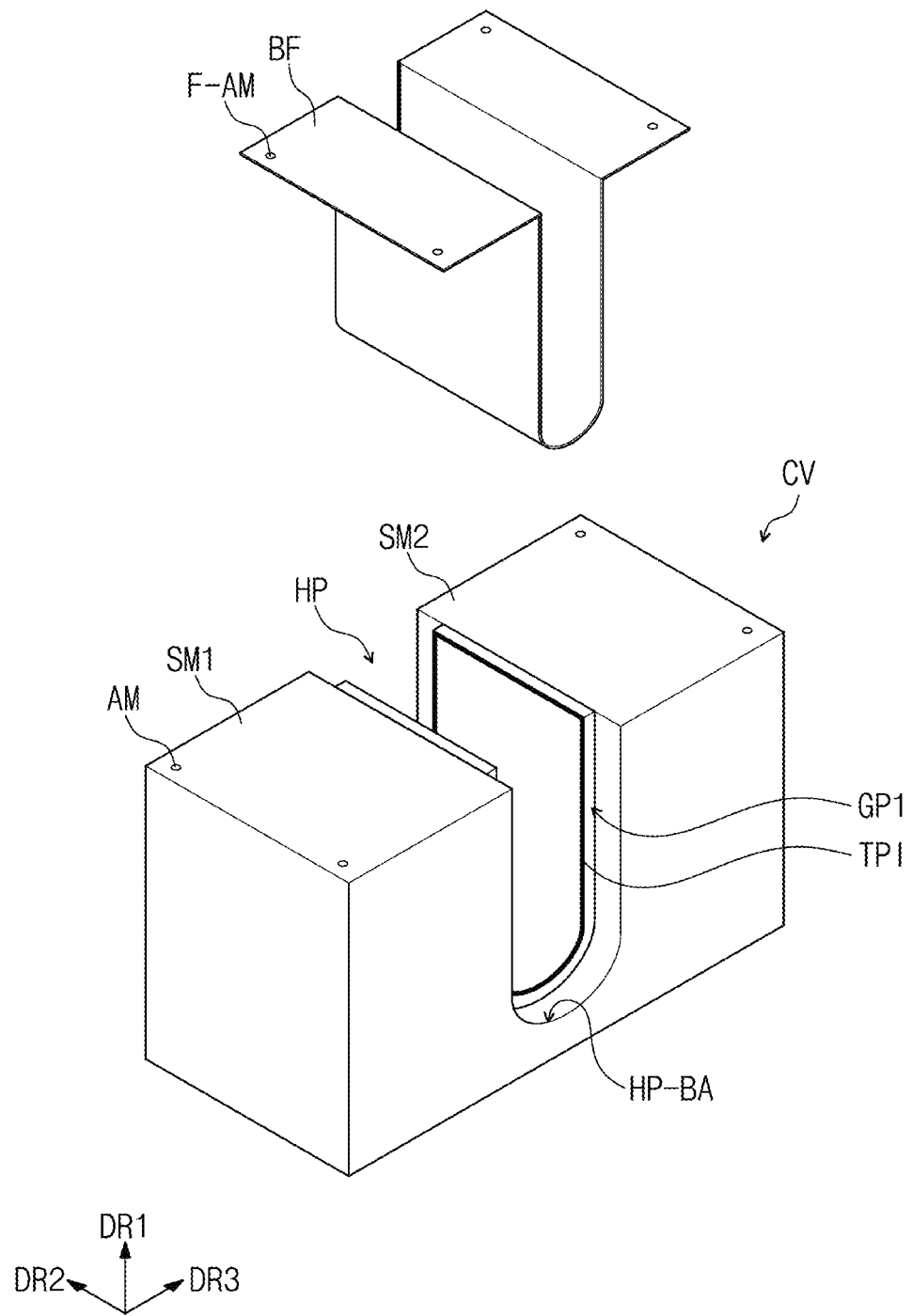
FIG. 13 is a perspective view illustrating one process of the method for manufacturing the window according to an embodiment.

FIG. 13 is a perspective view illustrating a state in which the base film BF is removed from the groove HP. Referring to FIG. 13, the process S1100 of removing the base film BF from the groove HP may remove the base film BF from the groove HP by moving the base film BF, which is remained after the ink layer TPI is removed from the heat transfer film TPF, upward while remaining the glass substrate GP1, to which the ink layer TPI is transferred, in the groove HP.

Figure 14:
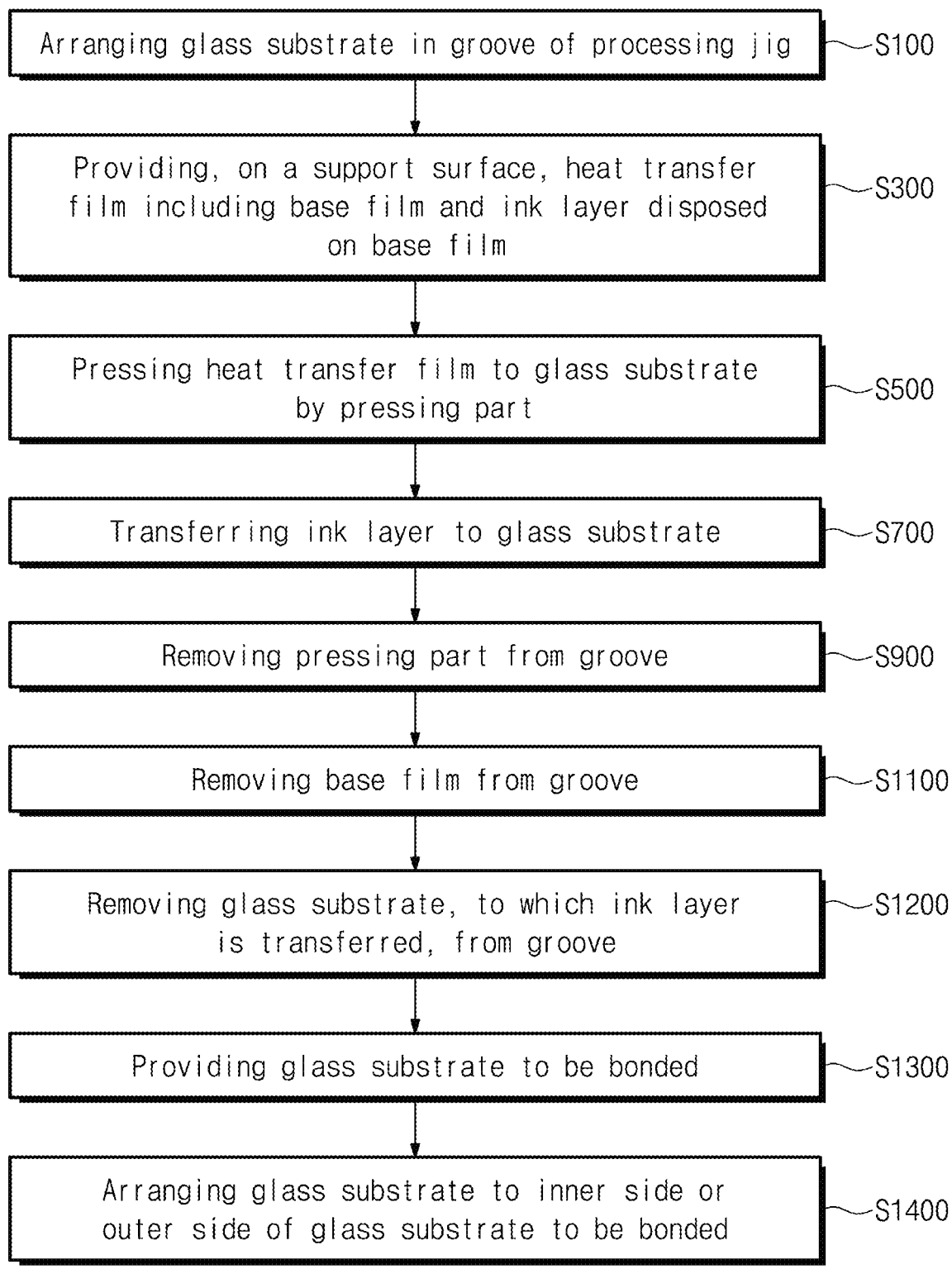
FIG. 14 is a flowchart representing a method for manufacturing a window according to an embodiment.
Figure 15:
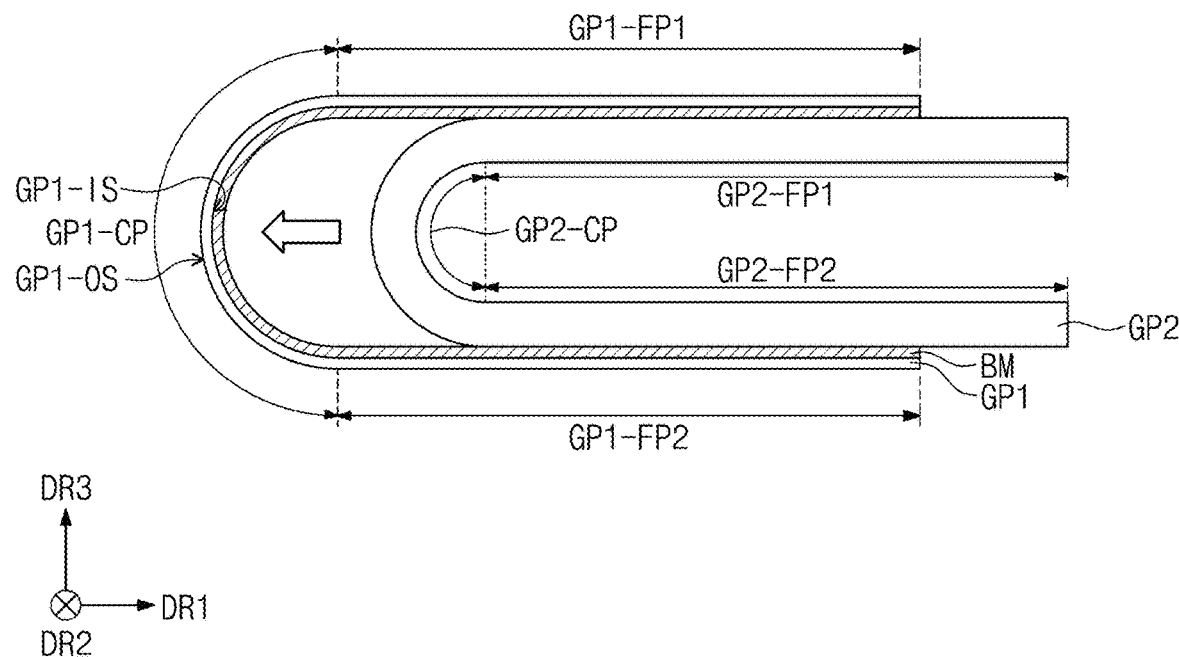
FIG. 15 is a cross-sectional view representing one process of the method for manufacturing the window according to an embodiment.
Figure 16:
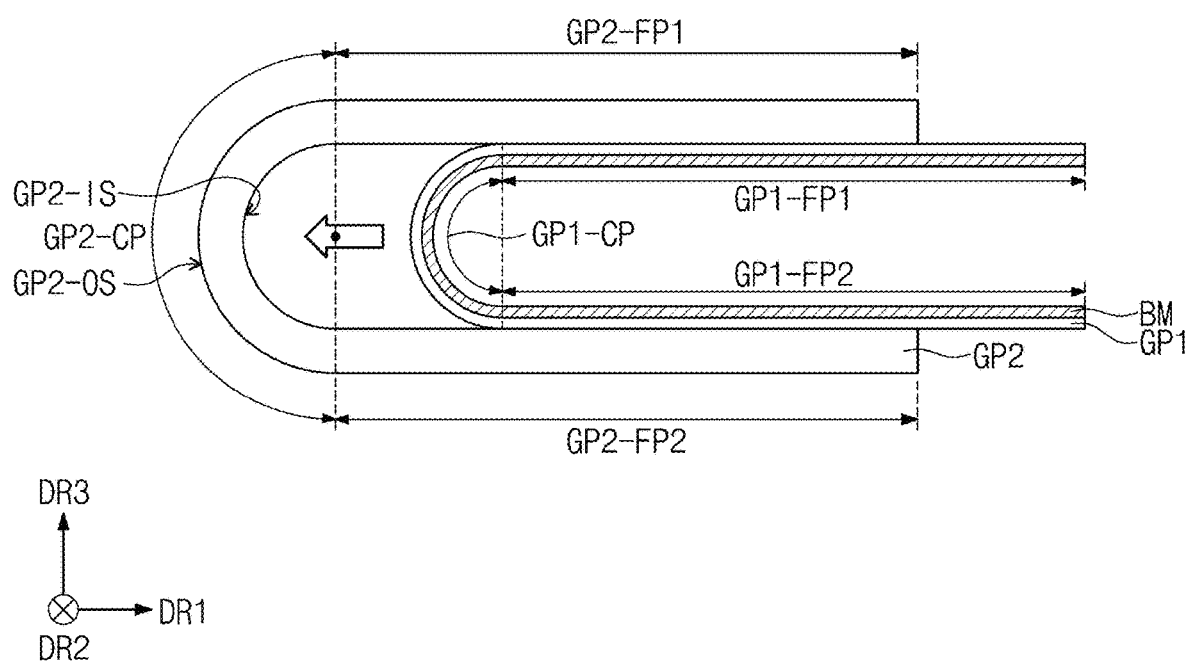
FIG. 16 is a cross-sectional view illustrating one process of the method for manufacturing the window according to an embodiment.

FIG. 14 is a flowchart representing a method for manufacturing a window according to an embodiment. FIGS. 15 to 16 are views illustrating one process of a method for manufacturing a window according to an embodiment. Hereinafter, a method for manufacturing a window according to an embodiment will be described in detail with reference to FIGS. 14 to 16. The same features as those described with reference to FIGS. 5 to 13 will be omitted, and different points will be mainly described.

The method for manufacturing the window according to an embodiment in FIGS. 14 to 16 is different from the method for manufacturing the window according to an embodiment in FIGS. 5 to 13 in that the method further includes a process S1200 of removing the glass substrate, to which the ink layer is transferred, from the groove, a process S1300 of providing a glass substrate to be bonded (hereinafter, referred to as a bonded glass substrate), and a process S1400 of arranging the glass substrate to an inner side or an outer side of the bonded glass substrate.

Referring to FIG. 14, the method for manufacturing the window according to an embodiment may further include the process S1200 of removing the glass substrate, to which the ink layer is transferred, from the groove, the process S1300 of providing the bonded glass substrate, and the process S1400 of arranging the glass substrate to the inner side or the outer side of the bonded glass substrate. In the process of providing a bonded glass substrate GP2, the bonded glass substrate GP2 may include a third flat part GP2-FP1 and a fourth flat part GP2-FP2, which face each other, with a second curved part GP2-CP disposed therebetween.

FIG. 15 is a cross-sectional view representing a process of arranging the glass substrate GP1 to an outer side GP2-OS of the bonded glass substrate GP2. Referring to FIG. 15, the method for manufacturing the window according to an embodiment may include a process of arranging the glass substrate GP1 to the outer side of the bonded glass substrate GP2. Referring to FIG. 3C again, the process S1400 (refer to FIG. 14) of arranging the glass substrate GP1 to the outer side GP2-OS of the bonded glass substrate GP2 may include a process of forming the adhesive layer ADL (refer to FIG. 3C) between the inner side GP1-IS of the glass substrate GP1 and the outer side GP2-OS of the bonded glass substrate GP2. The window in FIG. 3A may be manufactured through the method for manufacturing the window according to an embodiment, which is described with reference to FIG. 15. That is, the glass substrate GP1 in FIG. 15 may correspond to the first glass substrate TG in FIG. 3A, and the bonded glass substrate GP2 may correspond to the second glass substrate BG.

FIG. 16 is a cross-sectional view illustrating the process of arranging the glass substrate GP1 to the inner side GP2-IS of the bonded glass substrate GP2. Referring to FIG. 16, the method for manufacturing the window according to an embodiment may include the process of arranging the glass substrate GP1 to the inner side GP2-IS of the bonded glass substrate GP2. Referring to FIG. 4B again, the process S1400 (refer to FIG. 14) of arranging the glass substrate GP1 to the inner side GP2-IS of the bonded glass substrate GP2 may include a process of forming the adhesive layer ADL (refer to FIG. 4B) between the outer side GP1-OS of the glass substrate GP1 and the inner side GP2-IS of the bonded glass substrate GP2. The window in FIG. 4A may be manufactured through the method for manufacturing the window according to an embodiment, which is described with reference to FIG. 16. That is, the glass substrate GP1 in FIG. 16 may correspond to the second glass substrate BG in FIG. 4A, and the bonded glass substrate GP2 may correspond to the first glass substrate TG.

In an embodiment, the window may have excellent adhesive strength with the display module to be disposed at the inner side of the second glass substrate by including the first glass substrate bent to have a large bending angle, the second glass substrate bent to have a large bending angle and disposed at the inner side of the first glass substrate, and the light shielding layer disposed between the first glass substrate and the second glass substrate or disposed at the inner side of the second glass substrate.

In an embodiment, the method for manufacturing the window may easily form the light shielding layer at the inner side of the glass substrate bent to have a large bending angle by including the process of transferring the ink layer to the glass substrate by heating the heating part in the groove of the processing jig.

The window according to the embodiment may improve in roughness and surface property by bonding the glass substrate having the curved part bent with the large bending angle and including the light shielding layer and the glass substrate having the curved part bent with the large bending angle.

The method for manufacturing the window according to the embodiment may easily form the light shielding layer at the inner side of the glass substrate having the curved part bent to have the large bending angle by including the process of thermally transferring the ink layer to the inner side of the glass substrate in the groove of the processing jig.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

Hence, the real protective scope of the present invention shall be determined by the technical scope of the accompanying claims.

What is claimed is:

1. A window comprising:
a first glass substrate having a first thickness and comprising a first flat part and a second flat part, which face each other, with a first curved part disposed therebetween;
a second glass substrate having a second thickness, disposed at an inner side of the first glass substrate, and comprising a third flat part and a fourth flat part, which face each other, with a second curved part disposed therebetween;
a light shielding layer disposed between the first glass substrate and the second glass substrate; and
an adhesive layer disposed between the first glass substrate and the second glass substrate,
wherein each of the first glass substrate and the second glass substrate comprises:
a first area which overlaps the light shielding layer in a plan view; and
a second area which does not overlap with the light shielding layer,
wherein the first area surrounds the second area,
wherein the adhesive layer overlaps the second area and not overlap the first area, and
wherein the second glass substrate itself is rigid in a folded state.

2. The window of claim 1, wherein the first glass substrate has a thickness less than a thickness of the second glass substrate.

3. The window of claim 2, wherein the first glass substrate has the thickness in a range from about 20 μm to about 100 μm, and the second glass substrate has the thickness in a range from about 100 μm to about 1000 μm.

4. The window of claim 1, wherein the light shielding layer has a thickness in a range from about 5 μm to about 10 μm.

5. The window of claim 1, wherein the second curved part has an inner radius of curvature in a range from about 3 millimeters (mm) to about 4 mm.

6. The window of claim 1, wherein an average distance between the third flat part and the fourth flat part is in a range from about 6 mm to about 8 mm.

7. A window comprising:
a first glass substrate comprising a first flat part and a second flat part, which face each other, with a first curved part disposed therebetween;
a light shielding layer disposed on an outer side of the first glass substrate; and
an adhesive layer disposed on an outer side of the first glass substrate,
wherein the first glass substrate comprises:
a first area which overlaps the light shielding layer in a plan view; and
a second area which does not overlap with the light shielding layer, and the first area surrounds the second area,
wherein the adhesive layer overlaps the second area and not overlap the first area, and
wherein the first glass substrate itself is rigid in a folded state.

8. The window of claim 7, further comprising a second glass substrate which is disposed at an outer side of the light shielding layer,
wherein the second glass substrate comprises a third flat part and a fourth flat part, which face each other, with a second curved part disposed therebetween
wherein the second glass substrate is thinner than the first glass substrate.

9. The window of claim 8, wherein the first curved part has an outer radius of curvature equal to or less than an inner radius of curvature of the second curved part.

* * * * *